United States Patent
Lu et al.

(10) Patent No.: US 11,265,514 B2
(45) Date of Patent: Mar. 1, 2022

(54) MULTI-CAMERA CALIBRATION METHOD FOR A VEHICLE MOVING ALONG A VEHICLE ASSEMBLY LINE

(71) Applicant: MAGNA ELECTRONICS INC., Auburn Hills, MI (US)

(72) Inventors: Yuesheng Lu, Farmington Hills, MI (US); Steven V. Byrne, Goodrich, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 0 days.

(21) Appl. No.: 17/248,420

(22) Filed: Jan. 25, 2021

(65) Prior Publication Data
US 2021/0152784 A1    May 20, 2021

Related U.S. Application Data

(63) Continuation of application No. 16/401,159, filed on May 2, 2019, now Pat. No. 10,904,489, which is a
(Continued)

(51) Int. Cl.
*H04N 7/18*    (2006.01)
*G06T 7/80*    (2017.01)
(Continued)

(52) U.S. Cl.
CPC ............. *H04N 7/181* (2013.01); *B60R 1/00* (2013.01); *G06T 3/4038* (2013.01); *G06T 7/33* (2017.01);
(Continued)

(58) Field of Classification Search
CPC .. H04N 7/181; G06T 7/80; G06T 7/33; G06T 3/4038; G06T 2207/20092;
(Continued)

(56) References Cited

U.S. PATENT DOCUMENTS

| | | |
|---|---|---|
| 4,961,625 A | 10/1990 | Wood et al. |
| 4,966,441 A | 10/1990 | Conner |

(Continued)

FOREIGN PATENT DOCUMENTS

| | | |
|---|---|---|
| EP | 0353200 A2 | 1/1990 |
| EP | 0361914 A2 | 4/1990 |

(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Marnie A Matt
(74) *Attorney, Agent, or Firm* — Honigman LLP

(57) ABSTRACT

A method of calibrating a multi-camera vision system includes moving a vehicle along a vehicle assembly line having targets at respective side regions, with each target including a longitudinal line and a plurality of tick marks that extend laterally from the longitudinal line. As the vehicle moves along the vehicle assembly line it is equipped with a plurality of cameras and an image processor. As the vehicle moves along the vehicle assembly line, the target at a respective side region of the vehicle assembly line is present within the fields of view of front, side and rear cameras. Image data is captured by the cameras and processed to detect the targets and to determine misalignment of at least one of the cameras. The vehicular multi-camera vision system is calibrated by adjusting processing by the image processor of image data captured by the at least one misaligned camera.

31 Claims, 12 Drawing Sheets

Related U.S. Application Data continuation of application No. 15/663,979, filed on Jul. 31, 2017, now Pat. No. 10,284,818, which is a continuation of application No. 14/046,174, filed on Oct. 4, 2013, now Pat. No. 9,723,272.

(60) Provisional application No. 61/710,924, filed on Oct. 8, 2012, provisional application No. 61/710,247, filed on Oct. 5, 2012.

(51) Int. Cl.
  *G06T 7/33* (2017.01)
  *B60R 1/00* (2006.01)
  *G06T 3/40* (2006.01)

(52) U.S. Cl.
  CPC .......... *G06T 7/80* (2017.01); *B60R 2300/402* (2013.01); *G06T 2207/20092* (2013.01); *G06T 2207/30204* (2013.01); *G06T 2207/30252* (2013.01)

(58) Field of Classification Search
  CPC . G06T 2207/30204; G06T 2207/30252; B60R 1/00; B60R 2300/402
  USPC ........................................................ 348/148
  See application file for complete search history.

(56) References Cited

U.S. PATENT DOCUMENTS

| | | |
|---|---|---|
| 4,967,319 A | 10/1990 | Seko |
| 4,970,653 A | 11/1990 | Kenue |
| 5,003,288 A | 3/1991 | Wilhelm |
| 5,059,877 A | 10/1991 | Teder |
| 5,064,274 A | 11/1991 | Alten |
| 5,072,154 A | 12/1991 | Chen |
| 5,096,287 A | 3/1992 | Kakinami et al. |
| 5,148,014 A | 9/1992 | Lynam et al. |
| 5,166,681 A | 11/1992 | Bottesch et al. |
| 5,177,606 A | 1/1993 | Koshizawa |
| 5,182,502 A | 1/1993 | Slotkowski et al. |
| 5,193,029 A | 3/1993 | Schofield et al. |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,276,389 A | 1/1994 | Levers |
| 5,289,321 A | 2/1994 | Secor |
| 5,305,012 A | 4/1994 | Faris |
| 5,307,136 A | 4/1994 | Saneyoshi |
| 5,351,044 A | 9/1994 | Mathur et al. |
| 5,355,118 A | 10/1994 | Fukuhara |
| 5,386,285 A | 1/1995 | Asayama |
| 5,406,395 A | 4/1995 | Wilson et al. |
| 5,408,346 A | 4/1995 | Trissel et al. |
| 5,414,461 A | 5/1995 | Kishi et al. |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,469,298 A | 11/1995 | Suman et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,550,677 A | 8/1996 | Schofield et al. |
| 5,555,555 A | 9/1996 | Sato et al. |
| 5,568,027 A | 10/1996 | Feder |
| 5,574,443 A | 11/1996 | Hsieh |
| 5,648,835 A | 7/1997 | Uzawa |
| 5,661,303 A | 8/1997 | Teder |
| 5,670,935 A | 9/1997 | Schofield et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,796,094 A | 8/1998 | Schofield et al. |
| 5,837,994 A | 11/1998 | Stam et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,896,085 A | 4/1999 | Mori et al. |
| 5,920,367 A | 7/1999 | Kajimoto et al. |
| 5,923,027 A | 7/1999 | Stam et al. |
| 5,929,786 A | 7/1999 | Schofield et al. |
| 5,956,181 A | 9/1999 | Lin |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,175,300 B1 | 1/2001 | Kendrick |
| 6,184,781 B1 | 2/2001 | Ramakesavan |
| 6,198,409 B1 | 3/2001 | Schofield et al. |
| 6,201,642 B1 | 3/2001 | Bos |
| 6,226,061 B1 | 5/2001 | Tagusa |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,353,392 B1 | 3/2002 | Schofield et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,445,287 B1 | 9/2002 | Schofield et al. |
| 6,477,464 B2 | 11/2002 | McCarthy et al. |
| 6,498,620 B2 | 12/2002 | Schofield et al. |
| 6,515,378 B2 | 2/2003 | Drummond et al. |
| 6,516,664 B2 | 2/2003 | Lynam |
| 6,553,130 B1 | 4/2003 | Lemelson et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,565 B2 | 7/2003 | Heslin et al. |
| 6,593,698 B2 | 7/2003 | Stam et al. |
| 6,594,583 B2 | 7/2003 | Ogura et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |

(56) References Cited

U.S. PATENT DOCUMENTS

| | | |
|---|---|---|
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjonell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,807,287 B1 | 10/2004 | Hermans |
| 6,822,563 B2 | 11/2004 | Bos et al. |
| 6,823,241 B2 | 11/2004 | Shirato et al. |
| 6,824,281 B2 | 11/2004 | Schofield et al. |
| 6,864,930 B2 | 3/2005 | Matsushita et al. |
| 6,882,287 B2 | 4/2005 | Schofield |
| 6,889,161 B2 | 5/2005 | Winner et al. |
| 6,909,753 B2 | 6/2005 | Meehan et al. |
| 6,917,693 B1 | 7/2005 | Kiridena et al. |
| 6,946,978 B2 | 9/2005 | Schofield |
| 6,968,736 B2 | 11/2005 | Lynam |
| 6,975,775 B2 | 12/2005 | Rykowski et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,113,867 B1 | 9/2006 | Stein |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,167,796 B2 | 1/2007 | Taylor et al. |
| 7,195,381 B2 | 3/2007 | Lynam et al. |
| 7,202,776 B2 | 4/2007 | Breed |
| 7,227,459 B2 | 6/2007 | Bos et al. |
| 7,227,611 B2 | 6/2007 | Hull et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,375,803 B1 | 5/2008 | Bamji |
| 7,380,948 B2 | 6/2008 | Schofield et al. |
| 7,388,182 B2 | 6/2008 | Schofield et al. |
| 7,423,821 B2 | 9/2008 | Bechtel et al. |
| 7,425,076 B2 | 9/2008 | Schofield et al. |
| 7,526,103 B2 | 4/2009 | Schofield et al. |
| 7,541,743 B2 | 6/2009 | Salmeen et al. |
| 7,565,006 B2 | 7/2009 | Stam et al. |
| 7,566,851 B2 | 7/2009 | Stein et al. |
| 7,605,856 B2 | 10/2009 | Imoto |
| 7,619,508 B2 | 11/2009 | Lynam et al. |
| 7,720,580 B2 | 5/2010 | Higgins-Luthman |
| 7,786,898 B2 | 8/2010 | Stein et al. |
| 7,792,329 B2 | 9/2010 | Schofield et al. |
| 7,843,451 B2 | 11/2010 | Lafon |
| 7,855,778 B2 | 12/2010 | Yung et al. |
| 7,881,496 B2 | 2/2011 | Camilleri et al. |
| 7,914,187 B2 | 3/2011 | Higgins-Luthman et al. |
| 7,914,188 B2 | 3/2011 | DeLine et al. |
| 7,930,160 B1 | 4/2011 | Hosagrahara et al. |
| 7,949,486 B2 | 5/2011 | Denny et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,100,568 B2 | 1/2012 | DeLine et al. |
| 8,164,628 B2 | 4/2012 | Stein et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,452,055 B2 | 5/2013 | Stein et al. |
| 8,534,887 B2 | 9/2013 | DeLine et al. |
| 8,553,088 B2 | 10/2013 | Stein et al. |
| 9,723,272 B2 | 8/2017 | Lu et al. |
| 10,284,818 B2 | 5/2019 | Lu et al. |
| 10,904,489 B2 | 1/2021 | Lu et al. |
| 2002/0005778 A1 | 1/2002 | Breed et al. |
| 2002/0011611 A1 | 1/2002 | Huang et al. |
| 2002/0113873 A1 | 8/2002 | Williams |
| 2002/0131621 A1 | 9/2002 | Ohta |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0164228 A1 | 8/2004 | Fogg et al. |
| 2005/0219852 A1 | 10/2005 | Stam et al. |
| 2005/0237385 A1 | 10/2005 | Kosaka et al. |
| 2006/0017807 A1 | 1/2006 | Lee et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Wildmann et al. |
| 2007/0024724 A1 | 2/2007 | Stein et al. |
| 2007/0088488 A1 | 4/2007 | Reeves et al. |
| 2007/0104476 A1 | 5/2007 | Yasutomi et al. |
| 2007/0242339 A1 | 10/2007 | Bradley |
| 2008/0043099 A1 | 2/2008 | Stein et al. |
| 2008/0147321 A1 | 6/2008 | Howard et al. |
| 2008/0192132 A1 | 8/2008 | Bechtel et al. |
| 2008/0266396 A1 | 10/2008 | Stein |
| 2009/0001165 A1 | 1/2009 | Zhang et al. |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2009/0262192 A1 | 10/2009 | Schofield et al. |
| 2009/0290032 A1 | 11/2009 | Zhang et al. |
| 2010/0097443 A1 | 4/2010 | Lablans |
| 2010/0097444 A1 | 4/2010 | Lablans |
| 2011/0216194 A1 | 9/2011 | Kosaki |
| 2011/0216201 A1 | 9/2011 | McAndrew et al. |
| 2011/0300929 A1 | 12/2011 | Tardif et al. |
| 2012/0045112 A1 | 2/2012 | Lundblad et al. |
| 2012/0069185 A1 | 3/2012 | Stein |
| 2012/0200707 A1 | 8/2012 | Stein et al. |
| 2012/0314071 A1 | 12/2012 | Rosenbaum et al. |
| 2012/0320209 A1 | 12/2012 | Vico et al. |
| 2013/0141580 A1 | 6/2013 | Stein et al. |
| 2013/0147957 A1 | 6/2013 | Stein |
| 2013/0169812 A1 | 7/2013 | Lu et al. |
| 2013/0286193 A1 | 10/2013 | Pflug |
| 2014/0043473 A1 | 2/2014 | Gupta et al. |
| 2014/0063254 A1 | 3/2014 | Shi et al. |
| 2014/0098229 A1 | 4/2014 | Lu et al. |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |
| 2015/0356735 A1 | 12/2015 | Shimizu et al. |

FOREIGN PATENT DOCUMENTS

| | | |
|---|---|---|
| EP | 0640903 A1 | 3/1995 |
| EP | 0697641 A2 | 2/1996 |
| EP | 1115250 A1 | 7/2001 |
| EP | 2377094 A1 | 10/2011 |
| EP | 2667325 A1 | 11/2013 |

(56) References Cited

FOREIGN PATENT DOCUMENTS

| GB | 2233530 A | 1/1991 |
|---|---|---|
| JP | S5539843 A | 3/1980 |
| JP | S58110334 A | 6/1983 |
| JP | S6216073 | 4/1987 |
| JP | 6272245 | 5/1987 |
| JP | S62131837 A | 6/1987 |
| JP | 01123587 | 5/1989 |
| JP | H1168538 A | 7/1989 |
| JP | H236417 | 8/1990 |
| JP | 3099952 | 4/1991 |
| JP | H06227318 A | 8/1994 |
| JP | 07105496 | 4/1995 |
| JP | 2630604 | 7/1997 |
| JP | 200274339 A | 3/2002 |
| JP | 20041658 A | 1/2004 |
| WO | 1994019212 A2 | 9/1994 |
| WO | 1996038319 A2 | 12/1996 |
| WO | 2012139636 A1 | 10/2012 |
| WO | 2012139660 A1 | 10/2012 |
| WO | 2012143036 A1 | 10/2012 |

OTHER PUBLICATIONS

Behringer et al., "Simultaneous Estimation of Pitch Angle and Lane Width from the Video Image of a Marked Road," pp. 966-973, Sep. 12-16, 1994.

Borenstein et al., "Where am I? Sensors and Method for Mobile Robot Positioning", University of Michigan, Apr. 1996, pp. 2, 125-128.

Bow, Sing T., "Pattern Recognition and Image Preprocessing (Signal Processing and Communications)", CRC Press, Jan. 15, 2002, pp. 557-559.

Broggi et al., "Automatic Vehicle Guidance: The Experience of the ARGO Vehicle", World Scientific Publishing Co., 1999.

Broggi et al., "Multi-Resolution Vehicle Detection using Artificial Vision," IEEE Intelligent Vehicles Symposium of Jun. 2004.

Franke et al., "Autonomous driving approaches downtown", Intelligent Systems and Their Applications, IEEE 13 (6), 40-48, Nov./Dec. 1999.

IEEE 100—The Authoritative Dictionary of IEEE Standards Terms, 7th Ed. (2000).

Kastrinaki et al., "A survey of video processing techniques for traffic applications".

Philomin et al., "Pedestrain Tracking from a Moving Vehicle".

Sahli et al., "A Kalman Filter-Based Update Scheme for Road Following," IAPR Workshop on Machine Vision Applications, pp. 5-9, Nov. 12-14, 1996.

Sun et al., "On-road vehicle detection using optical sensors: a review", IEEE Conference on Intelligent Transportation Systems, 2004.

Van Leeuwen et al., "Motion Estimation with a Mobile Camera for Traffic Applications", IEEE, US, vol. 1, Oct. 3, 2000, pp. 58-63.

Van Leeuwen et al., "Motion Interpretation for In-Car Vision Systems", IEEE, US, vol. 1, Sep. 30, 2002, p. 135-140.

Van Leeuwen et al., "Real-Time Vehicle Tracking in Image Sequences", IEEE, US, vol. 3, May 21, 2001, pp. 2049-2054, XP010547308.

Van Leeuwen et al., "Requirements for Motion Estimation in Image Sequences for Traffic Applications", IEEE, US, vol. 1, May 24, 1999, pp. 145-150, XP010340272.

Vlacic et al. (Eds), "Intelligent Vehicle Tecnologies, Theory and Applications", Society of Automotive Engineers Inc., edited by SAE International, 2001.

Zheng et al., "An Adaptive System for Traffic Sign Recognition," IEEE Proceedings of the Intelligent Vehicles '94 Symposium, pp. 165-170 (Oct. 1994).

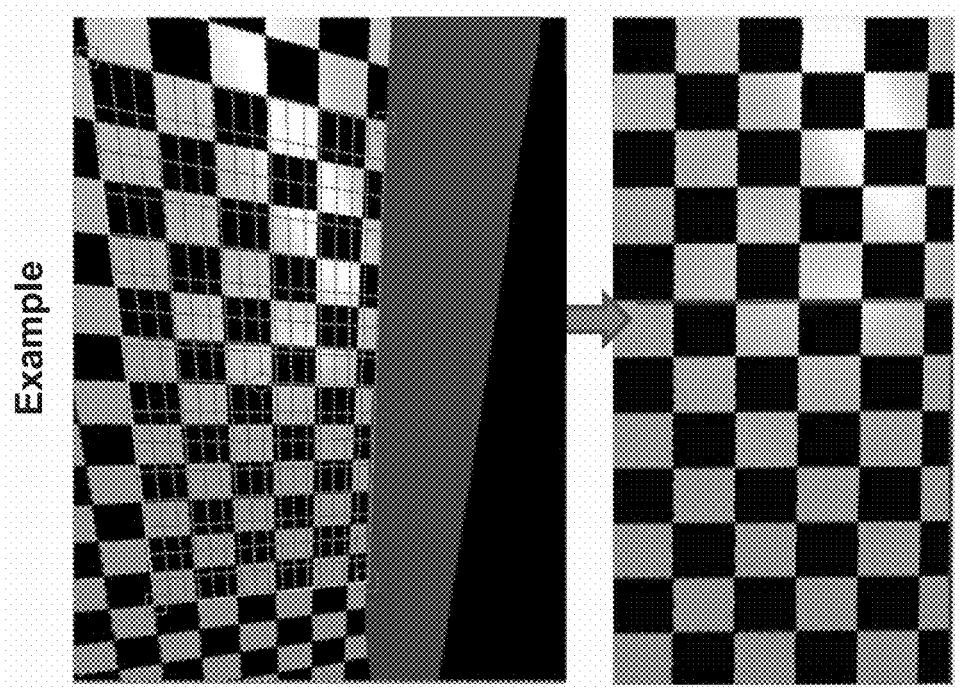
FIG. 10
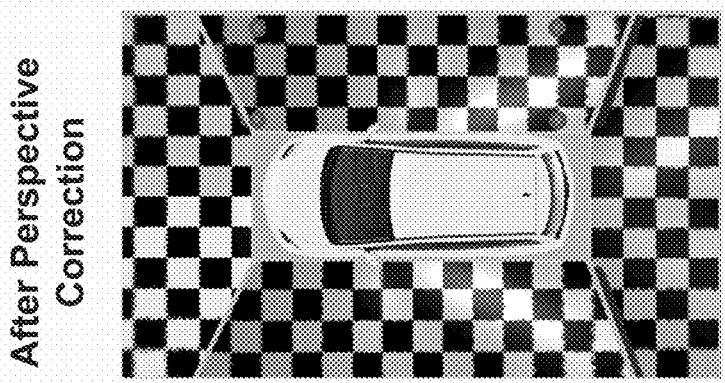
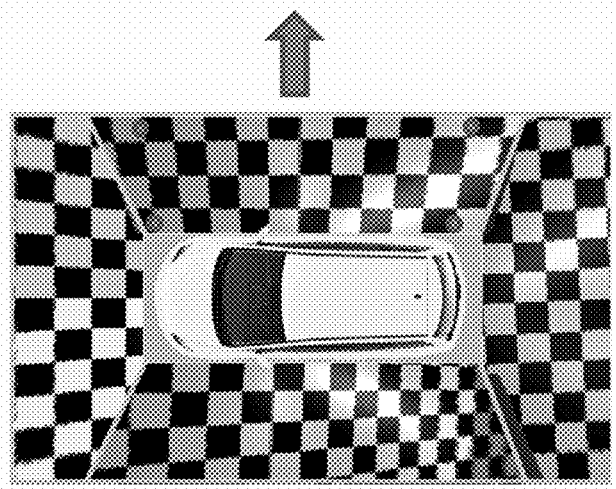
FIG. 9

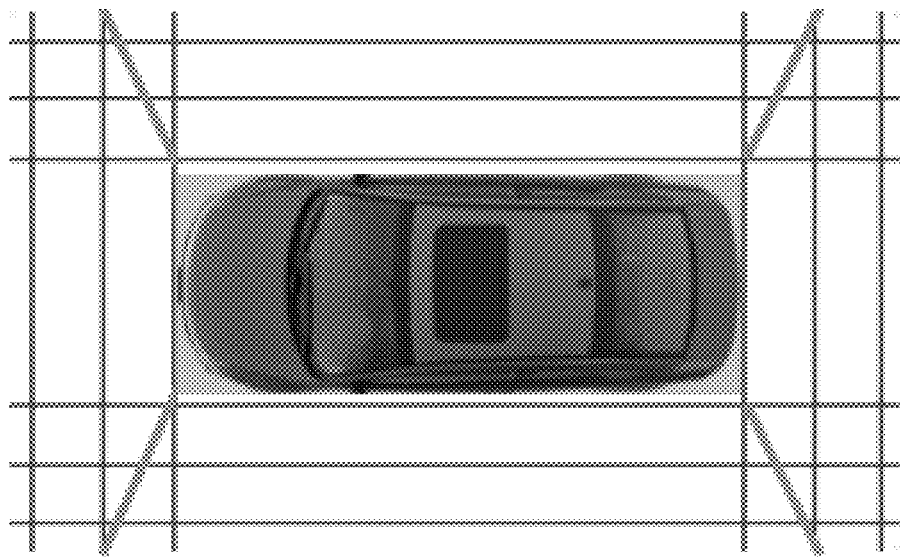
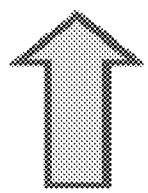
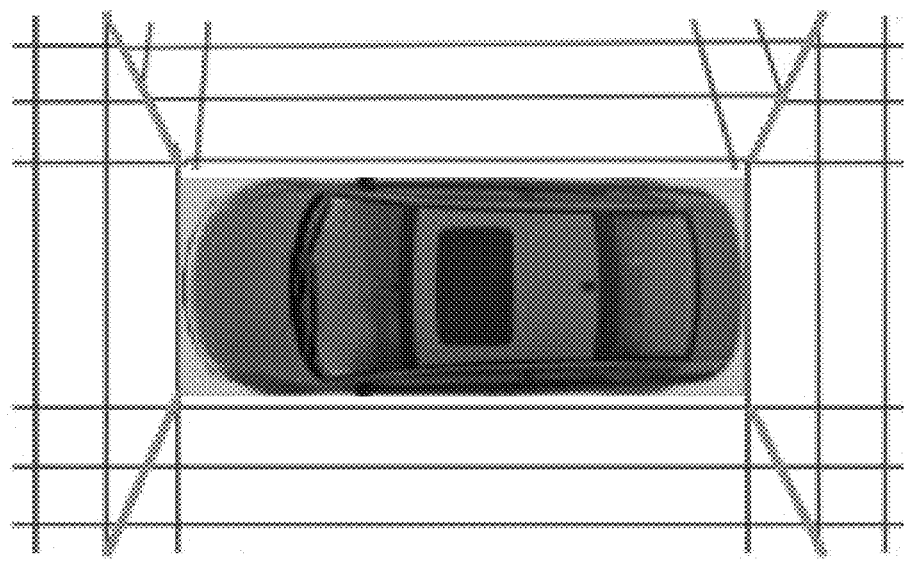
FIG. 18

MULTI-CAMERA CALIBRATION METHOD FOR A VEHICLE MOVING ALONG A VEHICLE ASSEMBLY LINE

CROSS REFERENCE TO RELATED APPLICATIONS

The present application is a continuation of U.S. patent application Ser. No. 16/401,159, filed May 2, 2019, now U.S. Pat. No. 10,904,489, which is a continuation of U.S. patent application Ser. No. 15/663,979, filed Jul. 31, 2017, now U.S. Pat. No. 10,284,818, which is a continuation of U.S. patent application Ser. No. 14/046,174, filed Oct. 4, 2013, now U.S. Pat. No. 9,723,272, which claims the filing benefits of U.S. provisional applications, Ser. No. 61/710,924, filed Oct. 8, 2012, and Ser. No. 61/710,247, filed Oct. 5, 2012, which are hereby incorporated herein by reference in their entireties.

FIELD OF THE INVENTION

The present invention relates generally to vision systems for vehicles and, more particularly, to vision systems having a plurality of exteriorly facing cameras disposed at a vehicle.

BACKGROUND OF THE INVENTION

Rear backup cameras and other exterior vision systems are known for use in vehicles. Examples of such systems are described in U.S. Pat. Nos. 7,859,565; 6,611,202; 6,222,447; 5,949,331; 5,670,935 and/or 5,550,677, which are hereby incorporated herein by reference in their entireties. Such systems may display images for viewing by the driver of the vehicle that provide a view exterior of the vehicle. It is known to provide a plurality of cameras at a vehicle, such as a forward facing camera, a rearward facing camera and opposite sideward facing cameras, and to stitch together images captured by the cameras to provide a surround view or top down view for displaying for viewing by a driver of the vehicle.

SUMMARY OF THE INVENTION

The present invention provides a means for calibrating the image stitching of the images captured by two or more cameras of a multi-camera vision system of a vehicle.

The present invention provides a simplified calibration process that uses multiple parallel lines with marks or tick marks for multi-camera image stitching calibration. The calibration system of the present invention may calibrate the camera and system while the vehicle is moving along a vehicle assembly line. Special targets trigger image capturing while the vehicle is moving. Optionally, the calibration system may utilize user actuatable inputs to provide a manual calibration process that a user can perform while viewing displayed images derived from image data captured by the vehicle cameras. The captured image data includes areas where there are overlapping fields of view of the cameras, with one or more targets or markings disposed at the overlapping regions to facilitate calibration of one or more of the cameras.

These and other objects, advantages, purposes and features of the present invention will become apparent upon review of the following specification in conjunction with the drawings.

BRIEF DESCRIPTION OF THE DRAWINGS

FIGS. 9 and 10 are schematics of images as processed via a perspective correction in accordance with the present invention;

FIG. 18 shows an image of a top down view of a vehicle before calibration (A) and after calibration (B) via a calibration system of the present invention.

DESCRIPTION OF THE PREFERRED EMBODIMENTS

Figure 1:
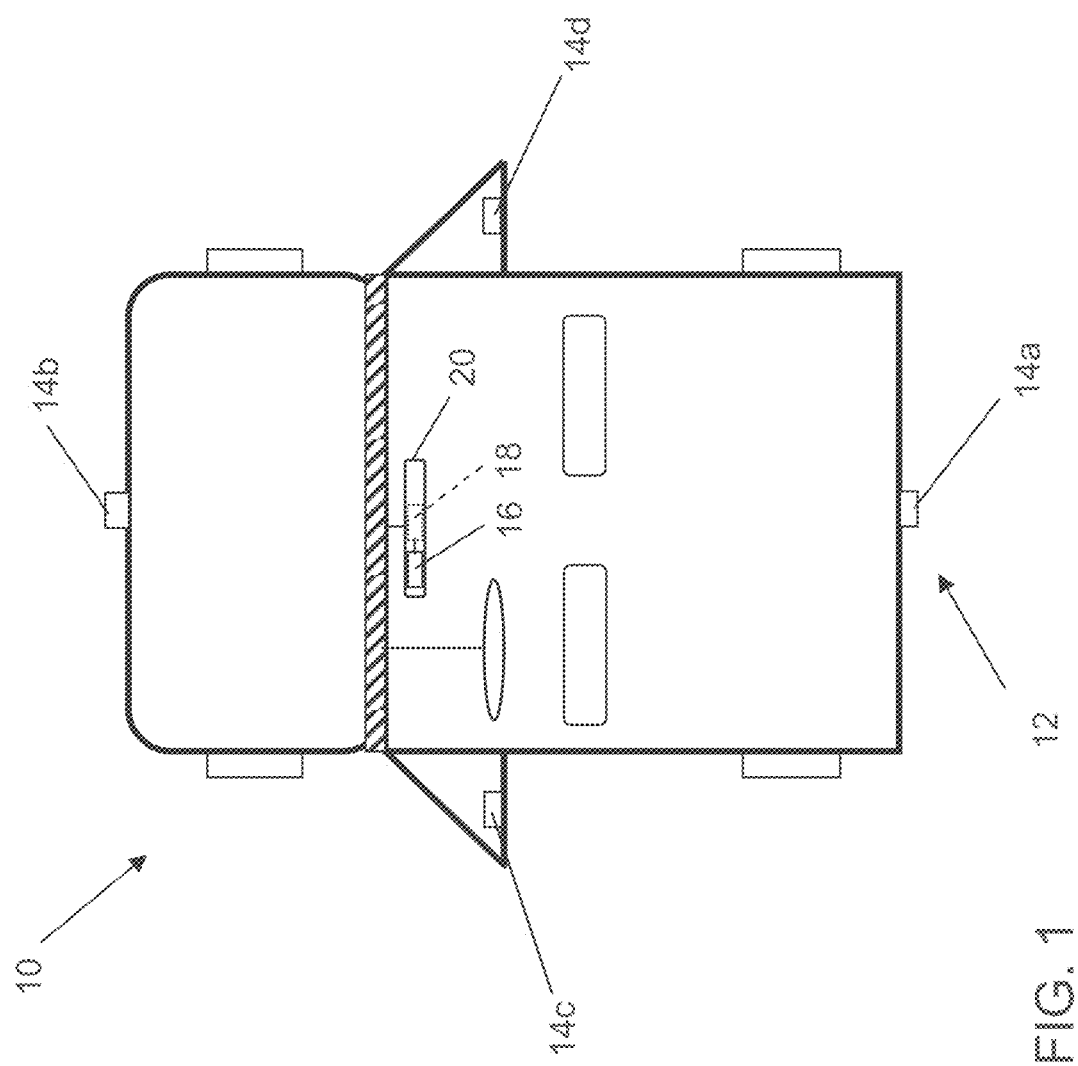
FIG. 1 is a plan view of a vehicle equipped with a multi-camera vision system in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14b at respective sides of the vehicle), which captures images exterior of the vehicle, with the camera having a lens for focusing images at or onto an imaging array or imaging plane or imager of the camera (FIG. 1). The vision system 12 includes a control or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle).

Figure 2:
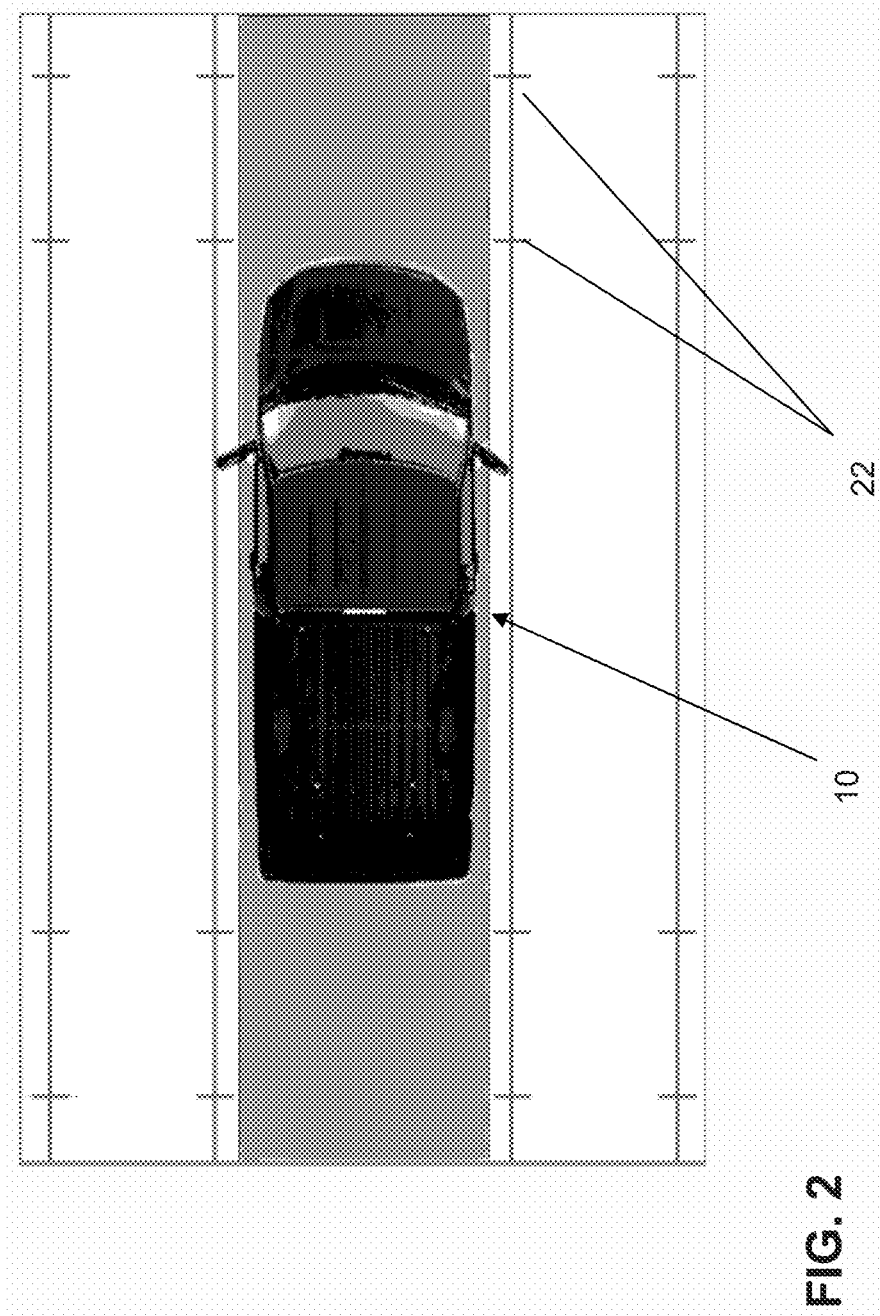
FIG. 2 is a plan view of a vehicle disposed at a calibration pattern in accordance with the present invention.

The present invention provides a simplified calibration process that uses targets or multiple parallel lines with marks or tick marks 22 for multi-camera image stitching calibration (FIG. 2). The calibration system of the present invention may calibrate the camera and system (such as by adjusting the field of view of the camera or cameras or adjusting image processing of image data captured by the camera or cameras or the like to accommodate for a misalignment or degree of miscalibration of the camera or cameras) while the vehicle is moving along a marked path or lane, such as along a vehicle assembly line or the like. The cameras and the image processing of images captured by the cameras are calibrated and/or adjusted to provide an enhanced stitched top down display image or birds eye view of the vehicle and its surroundings to the driver of the vehicle, as discussed below. The system may utilize aspects of the systems described in International Publication Nos. WO 2013/074604; WO 2012/145818 and WO 2012/145822, which are hereby incorporated herein by reference in their entireties.

Multi-Camera Stitching Calibration:

The stitching calibration process is described below:

The process provides a math model oriented, multi-target based nominal adjustment, where:

- the math model fully characterizes lens distortion and camera mounting positions;
- the math model provides for multi-axis dewarping and perspective change;
- multiple targets, targets coverage at stitching corners and camera front center;
- camera multi-axial (pitch, yaw and roll) deviation measurement by feature patterns on targets; and
- camera lens-imager misalignment measurement by feature patterns on targets.

The system uses the above math models to compute needed angle changes and pixel shifts. A final and minor pixel "nudging" to fine tune field mis-match due to lens deviation from a lens model (distortion curve deviation and cylindrical asymmetricity) is done via controlled and localized movement of group pixels around a stitching border area to achieve sufficient stitching performance.

Figure 4:
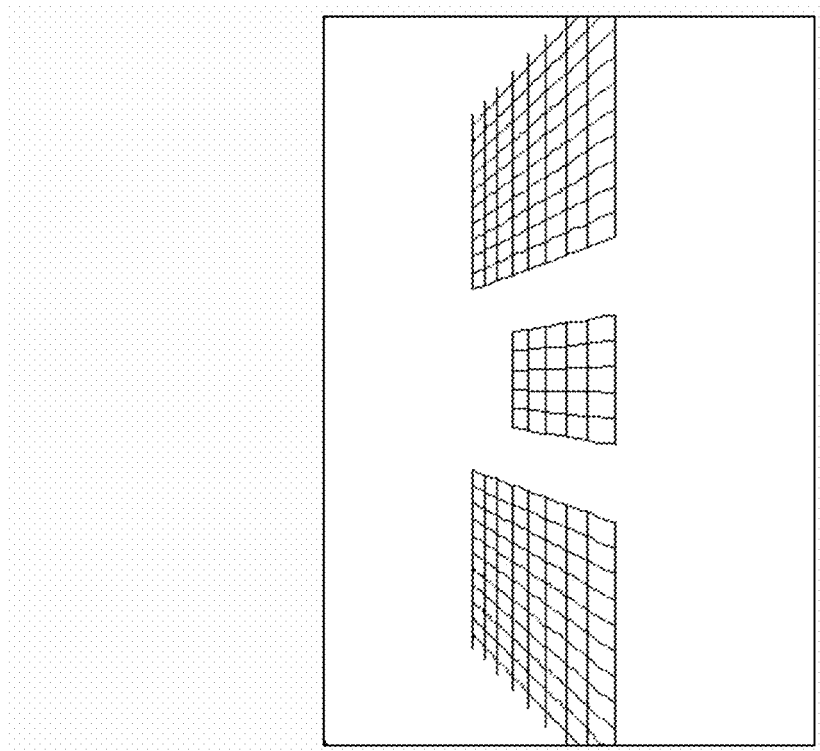
FIGS. 3-5 are exemplary images captured by a camera and adjusted via the process of the present invention.
Figure 3:
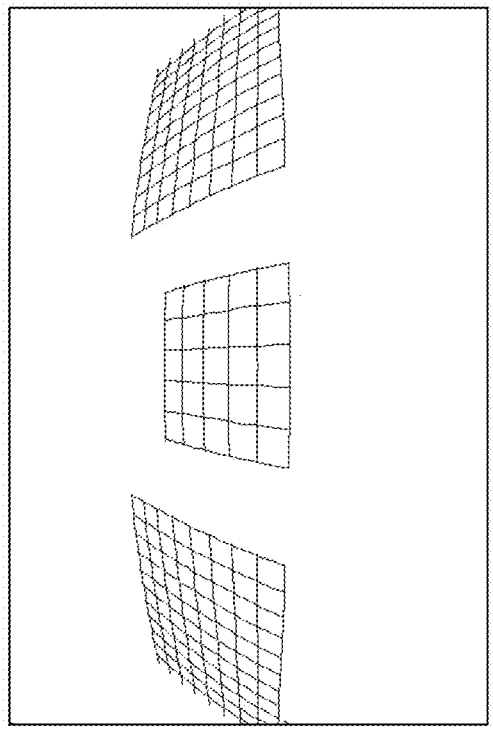
Figure 5:
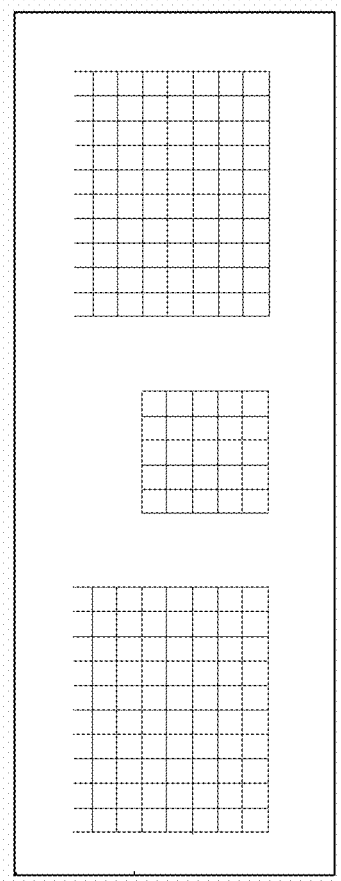

The calibration of a single camera in accordance with the present invention may utilize the following steps (and with reference to FIGS. 3-5):

Dewarp (flatten) image;
Utilize feature patterns on center targets to calculate lens-imager mis-alignment;
Utilize feature patterns on corner and center targets to calculate angle (pitch, yaw and roll) values to rotate;
Compensate for camera mounting deviation from nominal angles; and
Utilize perspective remapping and scaling to achieve birds-eye view.

Figure 6:
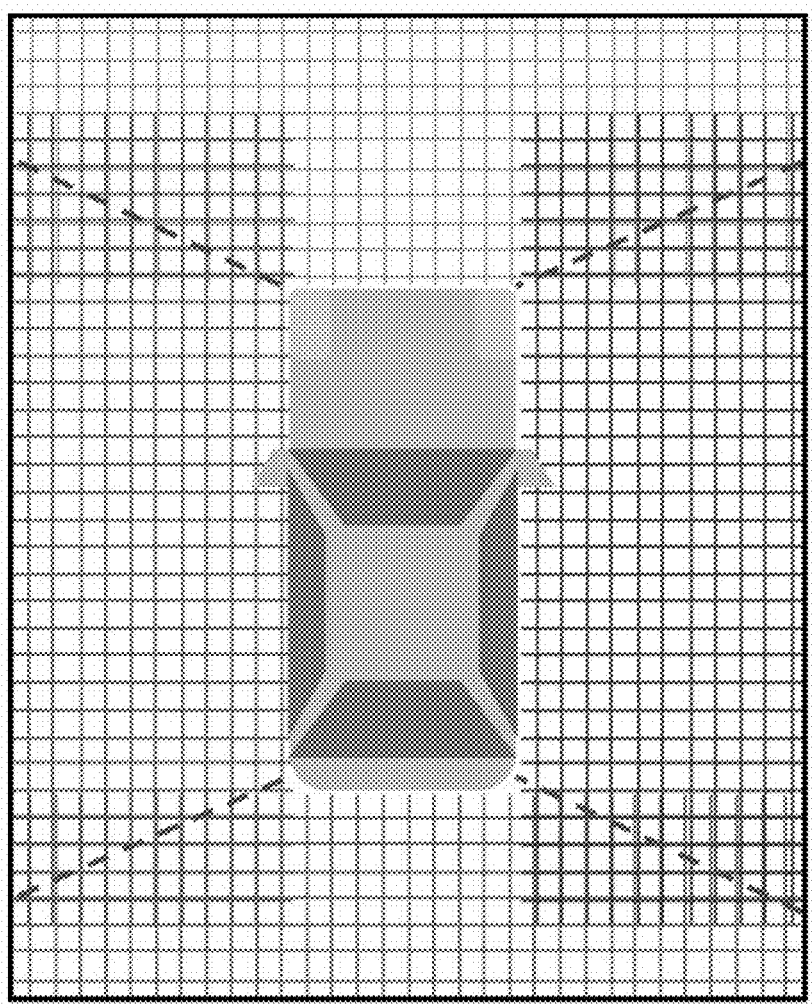
FIG. 6 is a plan view of a vehicle having its cameras calibrated in accordance with the present invention.

The calibration for multi-camera stitching in accordance with the present invention may utilize the following steps (and with reference to FIG. 6):

Merge multiple images to a single birds-eye view;
Use target signature patterns in overlapped area to measure mis-matching distances between the same signature patterns of two adjacent cameras; and
Determine if a larger (greater than a threshold level) mis-match exists;
If a threshold level (or greater than a threshold level) or degree of mis-match exists, move, stretch and/or rotate the whole camera image to achieve an acceptable or within tolerances or thresholds match;
If only a small mis-match (less than the threshold level) exists, stretch and move (nudge) pixels in the overlap area of adjacent camera images to achieve smooth stitching.

The above large pixel movement or pixel "nudge" should be within defined ranges. If the movement or nudge exceed the defined ranges, the system may run another iteration of single camera calibration and multi-camera matching.

Figure 7:
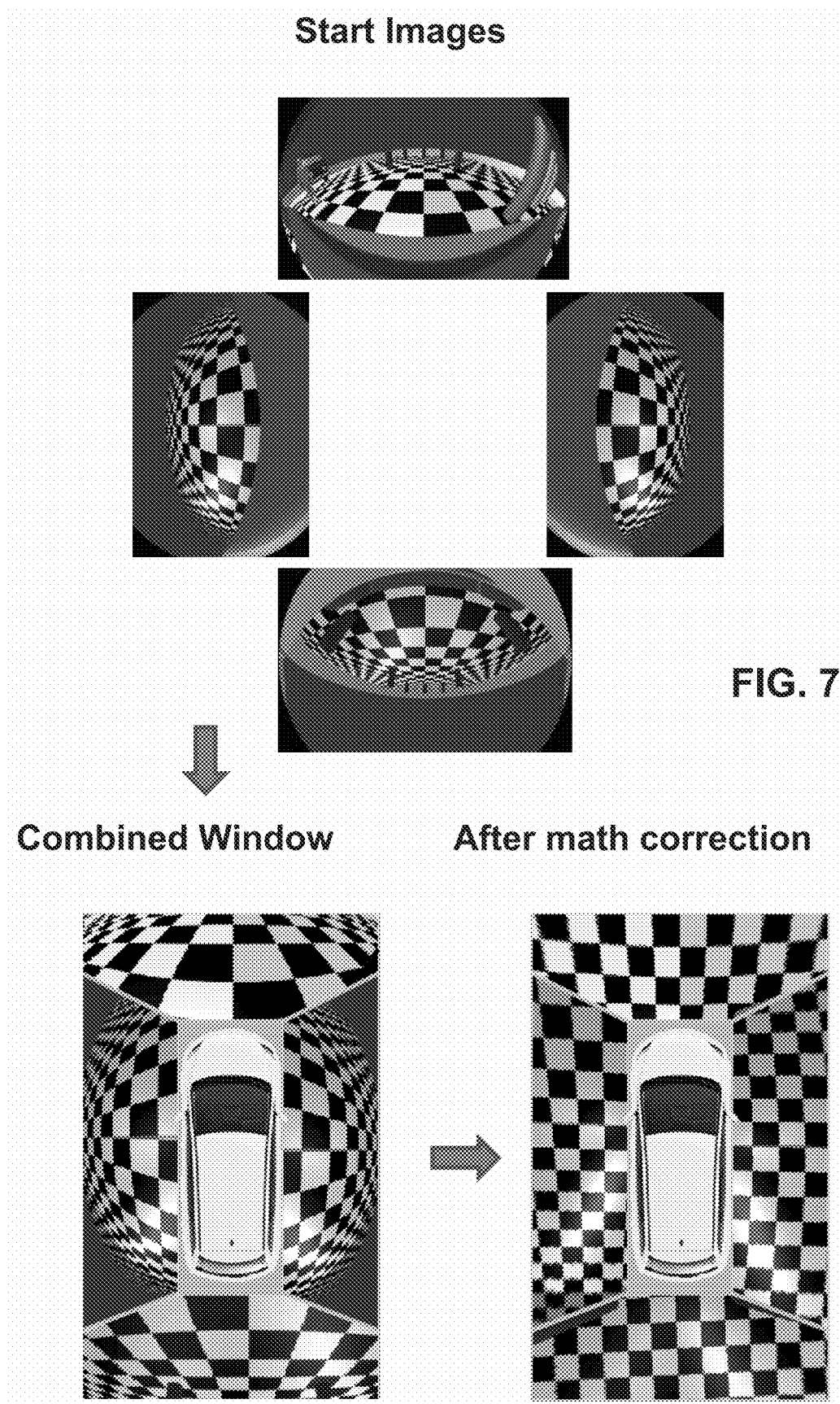
FIG. 7 is a schematic of a math correction process of the present invention.

Correction Steps Outline:

Step 1: Math model by pre-programmed Look-up Table or math formulas (with reference to FIG. 7):

Math model fully transform/corrects lens distortion based on lens nominal design data;
Math model adjusts all four (4) virtual camera positions to a vertical orientation over a selected floor location based on nominal vehicle CAD to achieve properly scaled top-down scenes;
Results will reveal some imperfections based on some physical rotation and translation errors common in a real-world environment;
Some distortion correction errors may be evident if the lens warp center is not at image center;
Lens distortion tolerance may be considered negligible and may not be measured or corrected for;
The resulting image or images (at the "After math correction" portion of FIG. 7) will better facilitate target finding algorithms.

Figure 8:
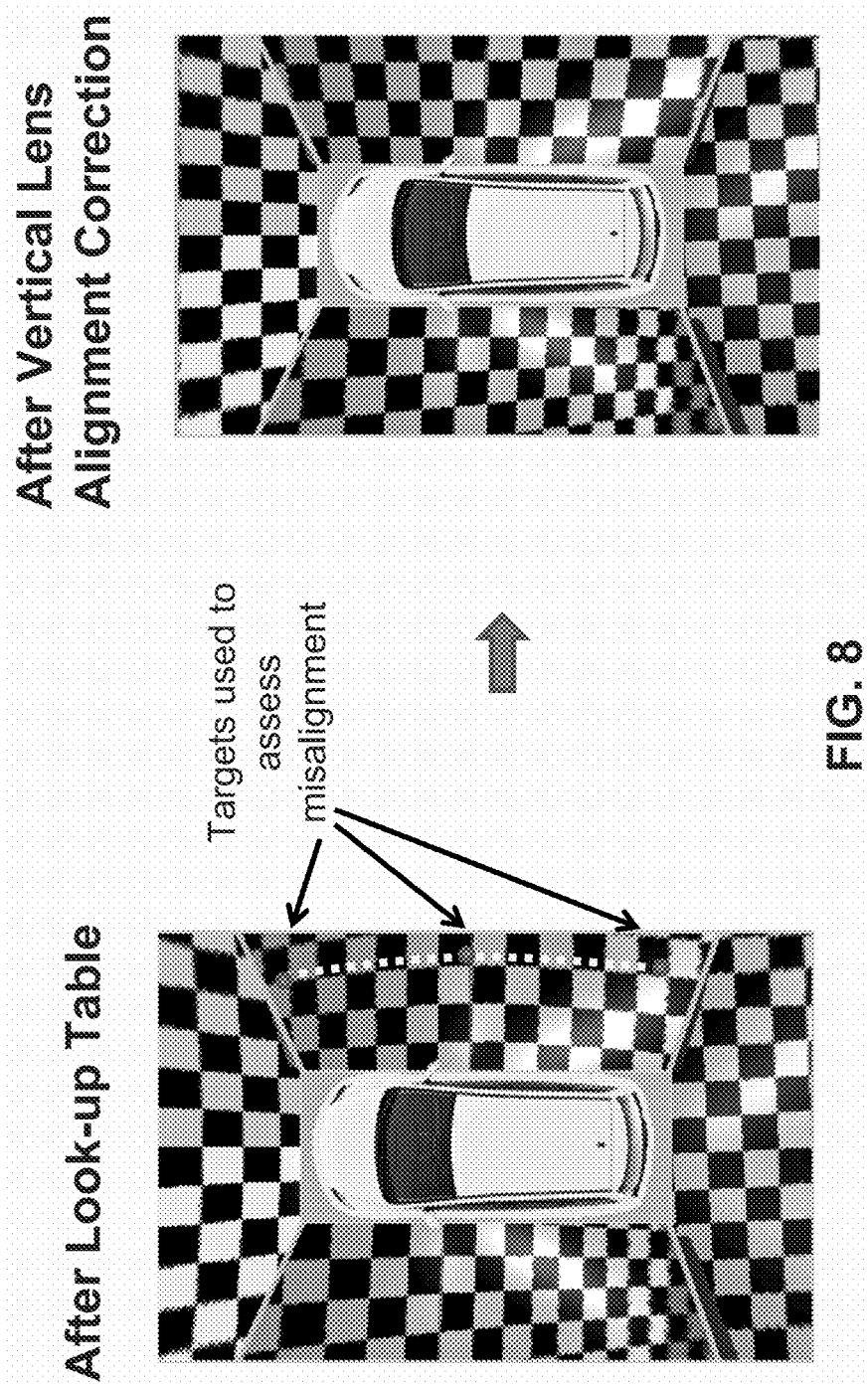
FIG. 8 is a schematic of the images before and after a lens-to-sensor misalignment assessment and correction process is performed in accordance with the present invention.
Figure 11:
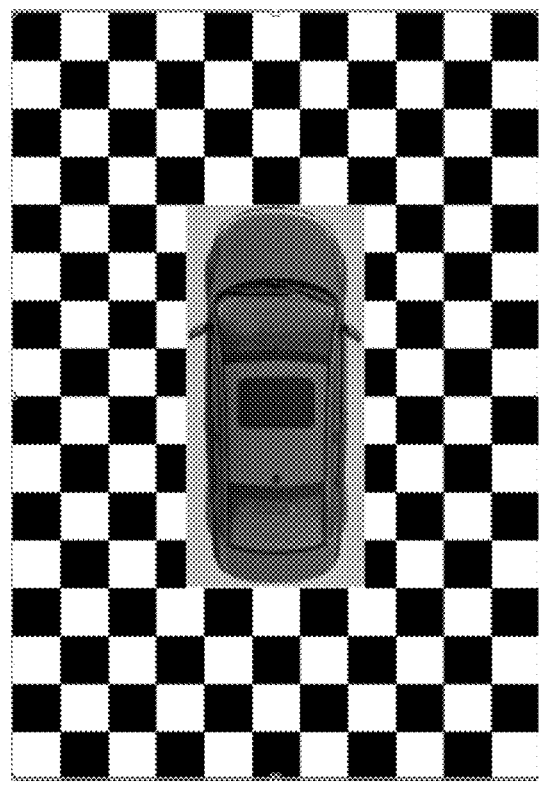
FIGS. 11-16 are plan view of vehicles disposed at various calibration patterns in accordance with the present invention.
Figure 12:
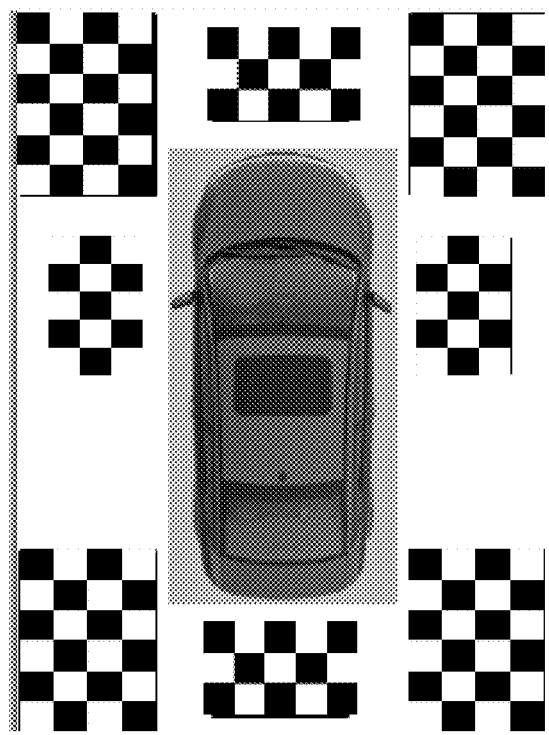
Figure 13:
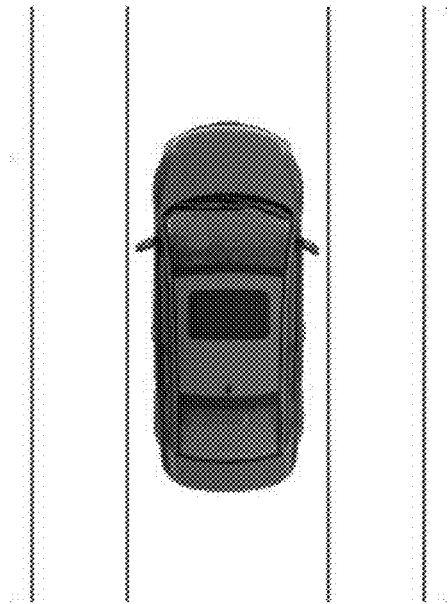
Figure 14:
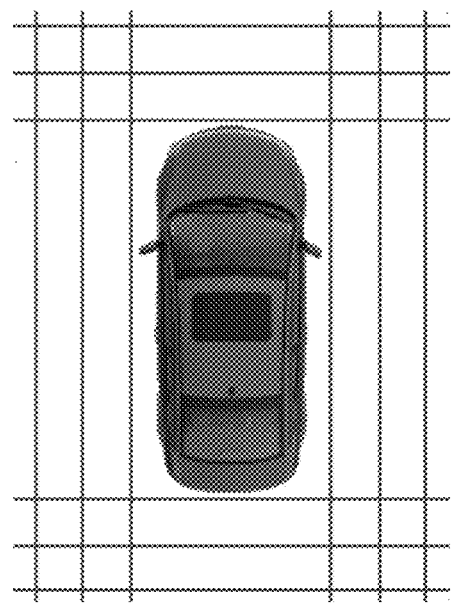
Figure 15:
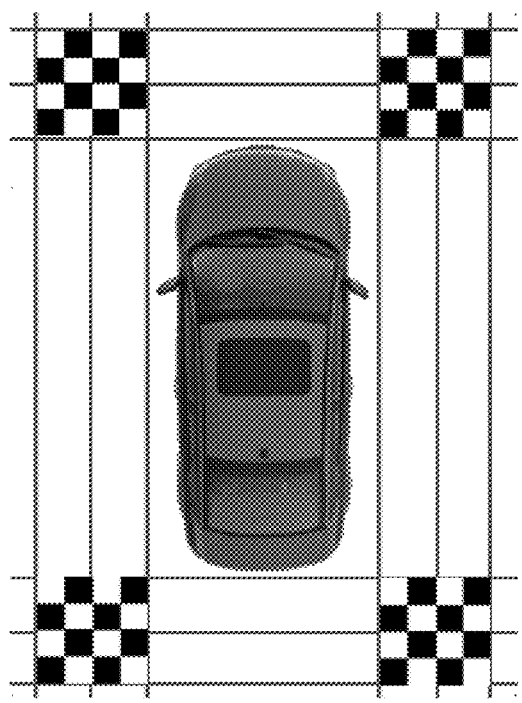
Figure 16:
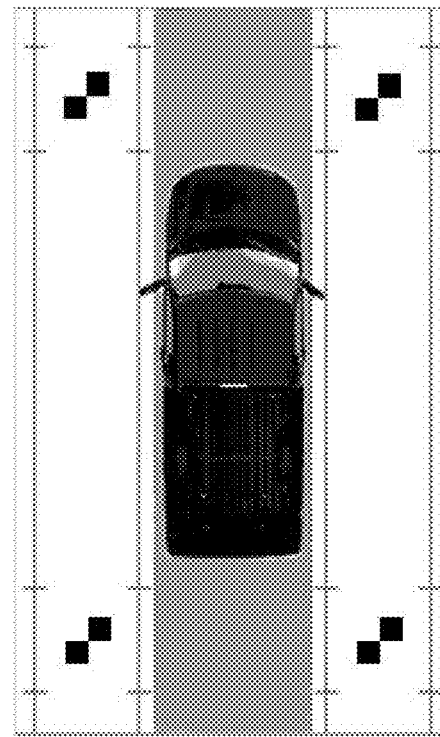

Step 2: Lens-to-Sensor Misalignment Assessment and Correction (with reference to FIG. 8):

The lens-to-sensor misalignment results in a mismatch between the warp center of the lens or lenses and algorithm's dewarp center. This mismatch results in a predictable curvature of the scene which should otherwise be flat. In general, vertical misalignment will primarily result in curved horizontal lines while horizontal misalignment will yield curved vertical lines.

This curvature is much more apparent when there is a vertical misalignment vs. horizontal for this type of application. The reason is that the actual positions of the cameras relative to the area to be seen necessitates more vertical image stretching. This amplifies the curvature of horizontal lines while diminishing the curvature of vertical lines. Furthermore, the areas to be seen in the final top-view scene show more image width than height (reference four windows for each camera). This makes the curvature of a horizontal line much more apparent.

The camera assembly systems with reasonable active lens-to-sensor alignment capabilities will reduce tolerances enough for horizontal misalignment to be ignored. Only horizontal target line curvatures need to be assessed to calculate and correct for vertical error.

The relationship between the degree of curvature of horizontal lines and vertical misalignment of lens to imager centers can be established by a set of math formulas or a look-up-table. The degree of curvature of horizontal lines can be measured by detecting edges and points of the target patterns. Thus, the vertical misalignment of an individual camera already mounted on the vehicle can be readily measured by the degree of horizontal lines of the target. The method of the present invention is especially advantageous for systems where there is no data communication between the cameras and the processing ECU, such that ECU cannot read each individual camera's "intrinsic parameters", which include the vertical misalignment of the lens to the imager center. The "intrinsic parameters" of each camera can be measured individually at the camera manufacturing and testing places and can be stored in non-volatile memory, such as EEPROM and flash memory. However, for the lower cost cameras and systems where "intrinsic parameters" cannot be saved or communicated to ECU, the only method to correct for the image distortion caused by misalignment of the lens to the imager center is to measure the misalignment during stitching calibration onsite at the vehicle assembly plant or service center. The above described method performs such a misalignment and compensation process.

Step 3: Perspective Correction (with reference to FIGS. 9 and 10):

Once all lines are straight, the remaining rotation and translation errors can be solved for so that perspective correction can be achieved by adjusting the virtual camera positions. A math model of homographic transformation represented by a 3×3 matrix is used to perform the perspective corrections. Other math models may be used to achieve similar perspective effects.

Aspect changes may be needed as well to better fit the final scene. The homographic transformation math model can fulfill the aspect change as well as the part of perspective correction.

Step 4: Pixel Nudge (fine tune):

Determine if large mis-matches (or greater than threshold level mis-matches) exist at overlap areas:

if yes, repeat steps 2 and 3.

If only small mis-match (less than threshold level), stretch and move (nudge) pixels in overlap area of adjacent camera images to achieve smooth stitching for displayed image.

The system of the present invention may utilize any suitable frame of reference at or near the vehicle for the vehicle to utilize a known or expected pattern or target to determine the calibration of the cameras and system. For example, and with reference to FIGS. 2 and 11-16, suitable target types may include a chess board pattern, continuous or discretely placed, parallel lines (two or more lines at each side of the vehicle), parallel lines with tick marks (such as tick marks or short marks that intersect the parallel lines at an angle, such as at 90 degrees relative to the parallel lines), parallel lines both vertical and horizontal, and/or added special patterns, dots, colors for homographic process and calibration triggering.

Vehicle Assembly Line Calibration with Vehicle Moving with Conveyer Line:

The present invention may use the following technique to calibrate multi-camera systems in a vehicle assembly line. For example, two or more straight lines may be placed at both sides of a vehicle conveyer of the assembly line (such as at or near the end of the assembly line). Multiple tick marks or horizontal short lines may be disposed at or placed on top of the longer straight lines that extend along the conveyor path. The vertical lines are long enough and spaced wide enough apart from the vehicle to cover an area that is required to calibrate multi-camera stitching. The tick marks or shorter lines or markings are placed at or near the corner areas of the vehicle where the adjacent cameras have overlapping fields of view on the ground.

When a vehicle is moved on a conveyer or a flat bed and into the calibration area, the multi-camera system is powered on and in the mode of waiting for trigger of picture acquisition or image capture. Some objects with special or particular shapes, colors, and/or patterns are placed at locations at the side of the conveyer, either on the ground or above ground. The objects are designed to be easily recognized and tracked in the camera images by an image processing unit (such as an image processor inside or part of the camera or an image processor in or part of a multi-camera processing unit). Once the vehicle is moved to a desired position, and the objects in the camera image reach the predefined locations, the processing unit will trigger an event that all the cameras will simultaneously acquire and store the images for the following stitching calibration computation. The stitching calibration process may be the same as the stitching calibration process done in a static fashion, such as described above.

Manual Stitching Calibration:

Using the techniques described above or by other suitable means or methods, the vision system or cameras of a vehicle coming out of a vehicle assembly plant may be calibrated or adjusted with suitable stitching performance. However, when the vehicle is involved in some kind of accident or other circumstances and needs a repair, such as when one or more cameras of a multi camera system is replaced on the vehicle, due to the variation or tolerance of the new camera(s) installation in terms of camera angles, the original stitching may no longer provide proper performance. In an automotive service center where the repair takes place, the environment in the shop floor may not be the same as the assembly plant and may have variations in lighting, space, ground evenness and/or the like. On the other hand, unlike in an assembly plant where the time of calibration for each vehicle is limited, in a service center, the technician has more time to calibrate a multi camera stitching than what's available in an assembly plant. Besides the possibility of using the same automatic calibration target and process as described above, one can use a manual calibration process that involves the adjustment and judgment of a human. The calibration involves human machine interface, such as a video display screen and/or one or more or several buttons or touch sensors or inputs or the like on the display touch panel, or if touch panel is not available, an external device that has buttons or inputs or sensors and connects to vehicle communication bus, or existing vehicle switches, dials, buttons, steering wheel or pedals or any other suitable user input.

Optionally, the calibration process can use any of the calibration targets described above (and such as shown in FIGS. 2 and 11-16).

Manual Calibration Control Interface:

The manual stitching calibration system or process of the present invention requires a human machine interface (HMI) which allows the user to view the real time image and judge the degree of stitching needed to provide the desired display image or images, and to control and manipulate the individual camera image or images. One or multiple targets may be disposed at or laid on the ground around the vehicle, with the patterns (such as lines, squares and/or the like) in the target assisting the user to judge the performance of stitching calibration.

Video Display

The video display in the vehicle, which displays the video output from a multi camera ECU can be used as the video display device. An external video monitor that connects to the video output of the ECU may optionally be used as the display device if it is required or desired for convenience or any other reasons. This external monitor can be a handhold video monitor, a video projector, a video monitor on a rolling cart, or a video display in one's eye glasses or any other suitable display device. The video monitor can have built-in graphic overlay patterns that can be used to assist the technician to perform the stitching calibration, such as like guiding the positioning of ground targets or the like.

Controller

The controller is a device that allows the user to enter commands to manipulate the camera images and to select one or more cameras or other activities during the stitching calibration process. The controller is connected to the multi-camera ECU, such as via a direct communication channel or via a vehicle bus. The following forms of controllers are suitable for use in the system of the present invention.

The controller may comprise or may be responsive to a touch panel of the video monitor that displays real time video. The buttons or sensors or inputs of or on the touch panel allow the user to manipulate images and perform the calibration. The communication of button status and commands may be through an internal vehicle bus network to which the video display and multi-camera ECU are both connected.

The controller may comprise a handheld device that connects to the vehicle bus network through a special port in vehicle. For example, a handheld device used commonly in a vehicle service center can be programmed to add and serve the stitching calibration purpose.

Using an existing control mechanism of the vehicle, for example, the buttons, dials and even steering wheel and pedals of the vehicle may also or otherwise be used while remaining within the spirit and scope of the present invention. Those existing mechanisms include and may not be limited to: cruise control buttons or inputs, radio control buttons or inputs, heat and NC control buttons or dials or inputs, light switches, windshield wiper control dials or buttons or inputs, the vehicle steering wheel, the brake and/or gas pedal and/or the like. Using these existing control mechanisms in the vehicle during service center calibration allows the vehicle manufacturers to save the cost of designing and providing a separate control device and deploying such a device to thousands of dealer service centers.

Figure 17:
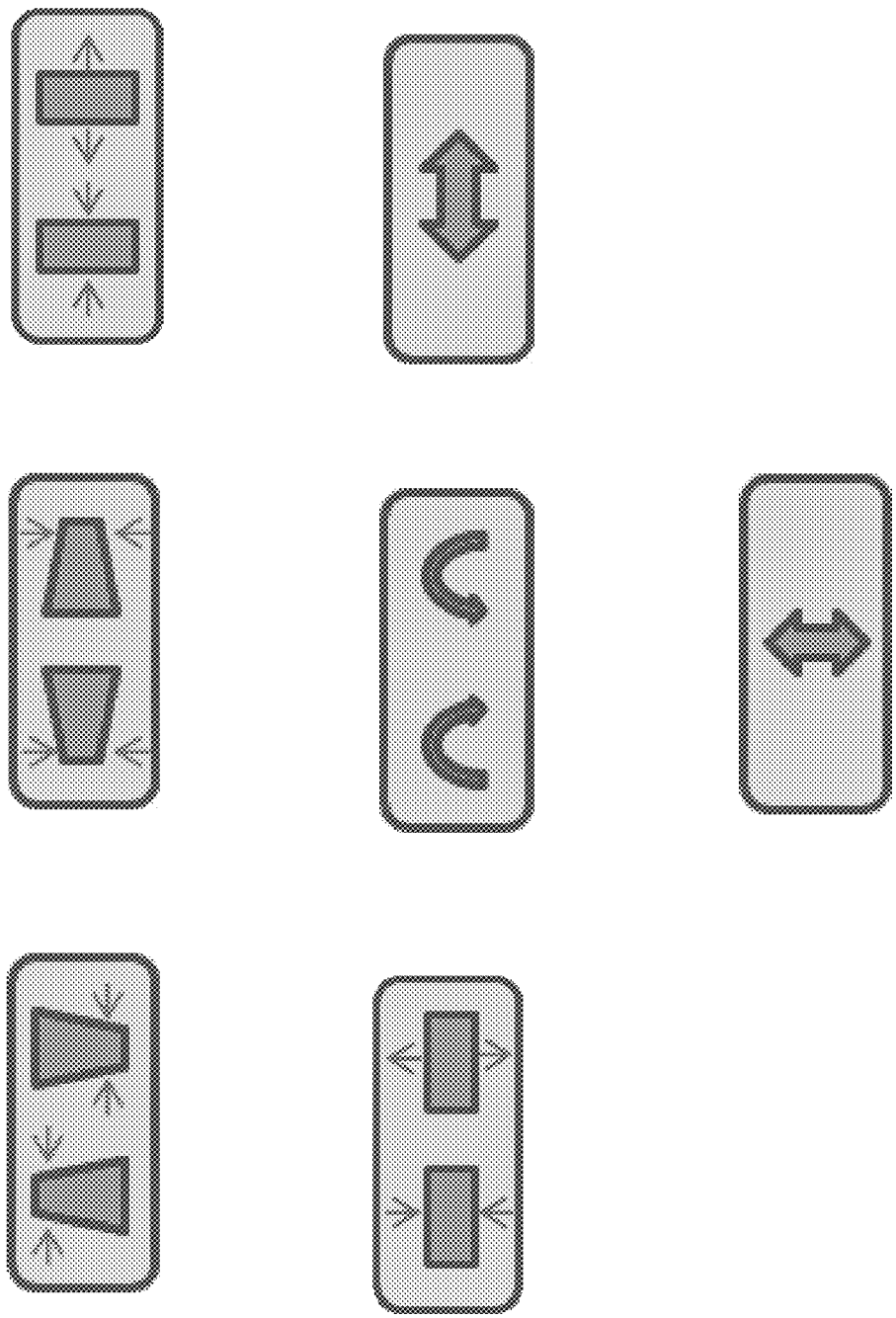
FIG. 17 are exemplary user inputs or interfaces suitable for use in the manual calibration process of the present invention.

Buttons to Manipulate Image:

The buttons or user inputs that the user can use during the manual calibration may include, but may not be limited to, the following:

Horizontal corner stretching and compression
Vertical corner stretching and compression
Horizontal stretching and compression
Vertical stretching and compression
Rotation—clockwise and counterclockwise
Horizontal shift
Vertical shift
Camera selection
Start and stop as optional Examples of touch panel on screen buttons or inputs or sensors are shown in FIG. 17. The images of those buttons or their deviations may also be shown on the screen even when an external device or existing mechanism or mechanisms of the vehicle are used. When an external button is pushed or toggled or actuated or another form of user input is pushed or toggled or actuated, a corresponding button or icon on the video screen may be highlighted and thus may signal to the user that this is selected input and action. The on screen buttons or icons or inputs may be displayed in an overlay graph and may have a semi-transparent nature.

Manual Calibration Process:

One Camera Calibration:

When only one camera needs to be calibrated, the technician can use the two adjacent cameras, which are still in good stitching status, as the calibration reference. The goal of the calibration process and the way to judge a good calibration is to manipulate the image of the camera being calibrated such that the patterns at the border match and smoothly transition between the good camera and the camera being calibrated. Also, when the camera is properly calibrated, the straight lines of the target will appear straight and the rectangles or squares of the target will be in their right shapes and scales.

As an example, and with reference to FIG. 18, image (A), the right side camera in a four camera system is out of calibration. The line pattern on the ground appears in the image as mismatched or not properly calibrated in the right side camera section. By manually rotating, stretching, and shifting the image, such as by using the appropriate push buttons or toggle buttons or user inputs, a user or technician can restore the left side camera image to a smoothly stitched with adjacent image sections, such as illustrated in image (B). This process of stitching calibration is based on direct human adjustment and judgment. It may take longer than the automatic stitching calibration described above, but it is suitable for use in an automotive service center where the conditions for automatic stitching calibration may not be feasible or met, due to, for example, improper lighting, inadequate space, and/or the like. On the other hand, a service center allows more time than an assembly plant for a technician to calibrate a multi camera stitching.

Figure 19:
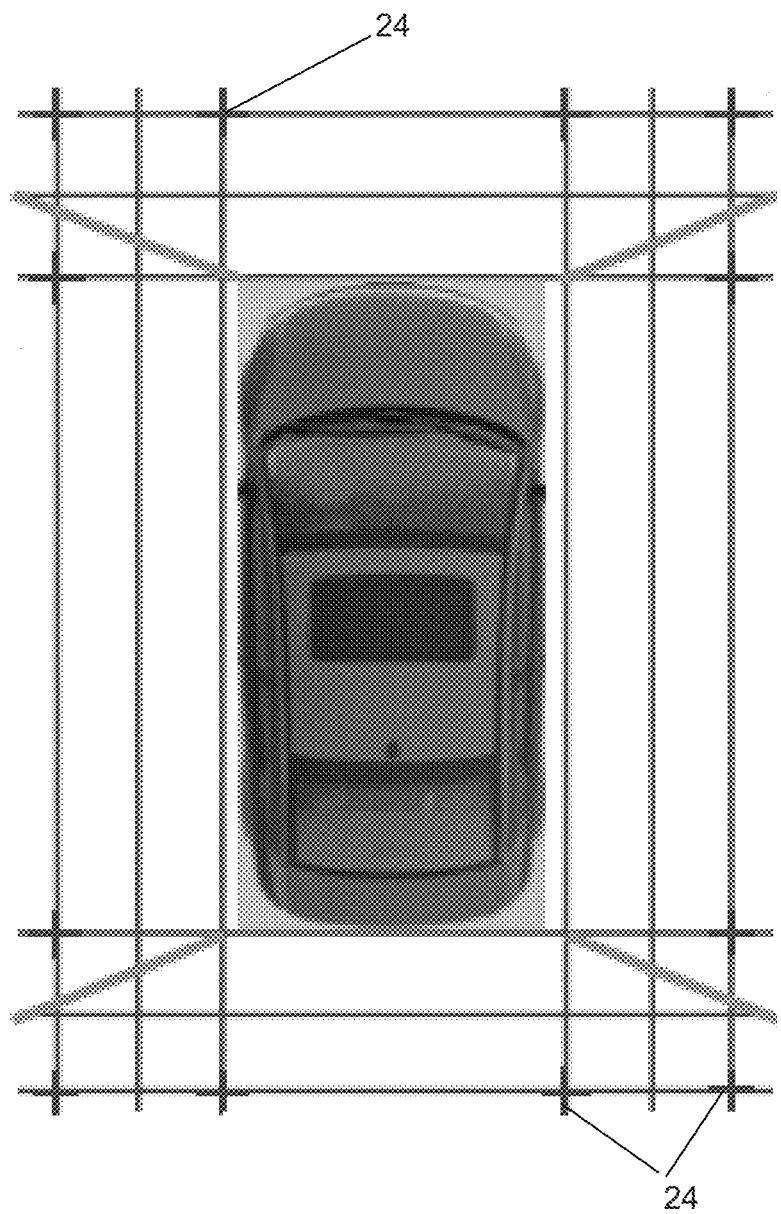
FIG. 19 is an image of a top down view of a vehicle for calibrating the cameras of the vision system via a graphic overlay means in accordance with the present invention.

Target Overlay:

Optionally, and as a tool to assist manual calibration process, the multi-camera ECU may be operable to generate an overlay pattern on the output image or displayed image. The overlay provides guidance to the person who is performing the calibration to position the target or targets at the ground around or by the vehicle to a proper and accurate location and angle relative to the vehicle. As an example, the crosses 24 shown in FIG. 19 (which may be colored or otherwise highlighted so as to be readily visible by the user during the calibration process) are overlay patterns that should (when the cameras are calibrated) overlap with the crossing points of horizontal and vertical lines of targets. The technician can use the overlay graph to move the target on the ground to the correct positions.

Two Cameras Calibration:

When two cameras need to be calibrated, and the two cameras are not adjacent to each other, the two other cameras can be used as calibration references. The process of calibration is to calibrate one camera at a time until both cameras are calibrated.

When the two cameras are adjacent one another and need to be calibrated, one can calibrate the one in the front or rear of the vehicle first, since the field of view of the front or rear camera is typically smaller than the field of view of either of the side cameras and thus easier to judge the deviation of target lines from the camera's calibrated state and from the adjacent good (calibrated) camera that can be served as the reference. As a main criteria, the lines should appear as straight and the rectangles or squares should appear in their right shapes and scales. At the border with the already calibrated camera, the patterns shall transition smoothly and continuously across the border or overlapping areas of the images. After the first camera is manipulated to reach the satisfactory state, one can use this first calibrated camera and the other already calibrated camera as calibration references for the second camera calibration. The calibration process for each camera may be similar to the single calibration process described above. After an initial calibration of the cameras, there may be the need to run another iteration of calibrating the first camera and then the second camera, since the first camera may not be calibrated properly via the initial calibration and this may be more evident when it is between two adjacent calibrated cameras. After the two cameras have run through the first pass of calibration, one can have a better view of how the whole birds eye view stitching performance looks and do some fine tuning of the two camera calibrations.

Three Camera Calibration:

When three of the four cameras of a multi-camera system are in need of calibration, one should first calibrate the camera adjacent to the remaining already calibrated camera for using the calibrated camera as the reference. As a main criteria, the lines shall appear as straight and the rectangles or square appear in their right shapes and scales. At the border with the already calibrated camera, the patterns shall transit smoothly and continuously across. When the first camera is calibrated, one can then follow the process described above for calibrating two adjacent cameras to perform calibration to the remaining two cameras. As in the process of calibrating two adjacent cameras, one might need to run another iteration to fine tune the camera manipulation of each of the three cameras to reach an optimized overall stitching calibration.

Four Camera Calibration:

When all four cameras are in need of stitching calibration, one may calibrate the front or rear camera first. The criteria are to manipulate the camera image so that the target lines appear straight and the rectangles or squares appear in their right shapes and scales. The horizontal lines appear level in the image to compensate for any camera rotation. One can use the calibration target pattern overlay described in the overlay section to judge the levelness of horizontal lines. Once the first camera is calibrated or roughly calibrated, one can follow the three camera calibration process described above to calibrate the remaining three cameras. One or more additional iterations of the calibration process may be performed to fine tune the camera manipulation of each of the four cameras to reach an optimized overall stitching calibration.

Therefore, the present invention provides a calibration process for manually and/or automatically calibrating one or more or all of the cameras of a multi-camera vision system of a vehicle. For example, the present invention provides a calibration process for calibrating the front, rear and driver side and passenger side cameras for a surround view or top-down view vision system of a vehicle.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described International Publication Nos. WO 2010/099416; WO 2011/028686; WO 2012/075250; WO 2013/019795; WO 2012-075250; WO 2012/154919; WO 2012/0116043; WO 2012/0145501 and/or WO 2012/0145313, and/or PCT Application No. PCT/CA2012/000378, filed Apr. 25, 2012, and published Nov. 1, 2012 as International PCT Publication No. WO 2012/145822, and/or PCT Application No. PCT/US2012/066571, filed Nov. 27, 2012, and published Jun. 6, 2013 as International PCT Publication No. WO 2013/081985, and/or PCT Application No. PCT/US2012/068331, filed Dec. 7, 2012, and published Jun. 13, 2013 as International PCT Publication No. WO 2013/086249, and/or PCT Application No. PCT/US2013/022119, filed Jan. 18, 2013, and published Jul. 25, 2013 as International PCT Publication No. WO 2013/109869, and/or U.S. patent application Ser. No. 13/333,337, filed Dec. 21, 2011, now U.S. Pat. No. 9,264,672, which are hereby incorporated herein by reference in their entireties.

The image processing and algorithmic processing may comprise any suitable means for processing the images and/or image data. For example, the vision system and/or processing may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/103193; WO 2012/0116043; WO 2012/0145501; WO 2012/0145343; WO 2012/154919; WO 2013/019707; WO 2013/016409; WO 2012/145822; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715 and/or PCT Application No. PCT/US2012/056014, filed Sep. 19, 2012, and published Mar. 28, 2013 as International PCT Publication No. WO 2013/043661, and/or PCT Application No. PCT/US2013/036701, filed Apr. 16, 2013, and published Oct. 24, 2013 as International Publication No. WO 2013/158592 and/or U.S. patent application Ser. No. 14/016,790, filed Sep. 3, 2013, and published Mar. 6, 2014 as U.S. Publication No. US-2014-0067206; Ser. No. 13/964,134, filed Aug. 12, 2013, now U.S. Pat. No. 9,340,227; Ser. No. 13/942,758, filed Jul. 16, 2013, and published Jan. 23, 2014 as U.S. Publication No. US-2014-0025240; Ser. No. 13/942,753, filed Jul. 16, 2013, and published Jan. 30, 2014 as U.S. Publication No. US-2014-0028852; Ser. No. 13/927,680, filed Jun. 26, 2013, and published Jan. 2, 2014 as U.S. Publication No. US-2014-0005907; Ser. No. 13/916,051, filed Jun. 12, 2013, now U.S. Pat. No. 9,077,098; Ser. No. 13/894,870, filed May 15, 2013, and published Nov. 28, 2013 as U.S. Publication No. US-2013-0314503; Ser. No. 13/887,724, filed May 6, 2013, and published Nov. 14, 2013 as U.S. Publication No. US-2013-0298866; Ser. No. 13/851,378, filed Mar. 27, 2013, now U.S. Pat. No. 9,319,637; Ser. No. 61/848,796, filed Mar. 22, 2012, and published Oct. 24, 2013 as U.S. Publication No. US-2013-0278769; Ser. No. 13/847,815, filed Mar. 20, 2013, and published Oct. 31, 2013 as U.S. Publication No. US-2013-0286193; Ser. No. 13/800,697, filed Mar. 13, 2013, and published Oct. 3, 2013 as U.S. Publication No. US-2013-0258077; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published Aug. 22, 2013 as U.S. Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published Jan. 3, 2013 as U.S. Publication No. US-2013-0002873, and/or U.S. provisional applications, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/840,542; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/834,129, filed Jun. 12, 2013; Ser. No. 61/834,128, filed Jun. 12, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/16,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/840,407, filed Apr. 10, 2013; Ser. No. 61/808,930, filed Apr. 5, 2013; Ser. No. 61/807,050, filed Apr. 1, 2013; Ser. No. 61/806,674, filed Mar. 29, 2013; Ser. No. 61/806,673, filed Mar. 29, 2013; Ser. No. 61/804,786, filed Mar. 25, 2013; Ser. No. 61/793,592, filed Mar. 15, 2013; Ser. No. 61/793,614, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/770,048, filed Feb. 27, 2013; Ser. No. 61/766,883, filed Feb. 20, 2013; Ser. No. 61/760,366, filed Feb. 4, 2013; Ser. No. 61/760,364, filed Feb. 4, 2013; Ser. No. 61/758,537, filed Jan. 30, 2013; Ser. No. 61/756,832, filed Jan. 25, 2013; Ser. No. 61/754,804, filed Jan. 21, 2013; Ser. No. 61/745,925, filed Dec. 26, 2012; Ser. No. 61/745,864, filed Dec. 26, 2012; Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/718,382, filed Oct. 25, 2012; and/or Ser. No. 61/713,772, filed Oct. 15, 2012, which are all hereby incorporated herein by reference in their entireties. The system may communicate with other communication systems via any suitable means, such as by utilizing aspects of the systems described in International Publication No. WO 2013/043661, PCT Application No. PCT/US10/038477, filed Jun. 14, 2010, and/or PCT Application No. PCT/US2012/066571, filed Nov. 27, 2012, and published Jun. 6, 2013 as International PCT Publication No. WO 2013/081985, and/or U.S. patent application Ser. No. 13/202,005, filed Aug. 17, 2011, now U.S. Pat. No. 9,126,525, which are hereby incorporated herein by reference in their entireties.

Typically, a rearward facing camera for a rear vision system or backup assist system is activated responsive to the driver of the equipped vehicle shifting the gear actuator into a reverse gear position, whereby video images captured by the camera are displayed at the video display screen. When the reversing maneuver is completed, such as when the driver of the vehicle finally shifts the gear actuator out of the reverse gear position (and into either a park or neutral position or a forward gear position), display of the images captured by the camera ceases and the camera is often deactivated. The vision display system may operate to display the rearward images at the video mirror display responsive to the driver of the vehicle shifting the vehicle into a reverse gear such as by utilizing aspects of the vision systems described in U.S. Pat. Nos. U.S. Pat. Nos. 5,550,677; 5,670,935; 6,498,620; 6,222,447 and/or 5,949,331, and/or PCT Application No. PCT/US2011/056295, filed Oct. 14, 2011 and published Apr. 19, 2012 as International Publication No. WO 2012/051500, and/or U.S. patent application Ser. No. 13/333,337, filed Dec. 21, 2011, now U.S. Pat. No. 9,264,672, which are hereby incorporated herein by reference in their entireties.

The rearward facing camera or camera module may comprise any suitable camera or imaging sensor, and may utilize aspects of the cameras or sensors described in U.S. Pat. Nos. 7,965,336 and/or 7,480,149, and/or U.S. patent application Ser. No. 12/091,359, filed Apr. 24, 2008 and published Oct. 1, 2009 as U.S. Publication No. US-2009-0244361, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,720,580; 7,965,336; 7,339,149; 7,038,577 and 7,004,606; and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

Optionally, the exterior facing camera or cameras (such as, for example, the forward facing camera and/or the rearward facing camera and/or the sideward facing cameras) may have a wide angle rearward field of view, such as a wide angle rearward field of view that encompasses about 185 degrees (fields of view larger and smaller than this may be contemplated while remaining within the spirit and scope of the present invention). Thus, during a reversing maneuver, the rearward facing camera and video processor and video display screen can operate to display entire images (or substantially entire images) captured by the rearward facing camera (such as, for example, images encompassed by the about 185 degree field of view of the camera), in order to provide video images to the driver of the vehicle of a wide area or region or blind zone immediately rearward of the vehicle to assist the driver of the vehicle in making the reversing maneuver. The rearward facing camera and/or video processor and/or video display screen and/or backup assist system may utilize aspects of the systems described in U.S. Pat. Nos. 5,550,677; 5,760,962; 5,670,935; 6,201,642; 6,396,397; 6,498,620; 6,717,610; 6,757,109; 7,005,974 and/or 7,265,656, which are hereby incorporated herein by reference in their entireties.

The camera module and circuit chip or board and imaging sensor and processor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929, 786 and/or 5,786,772, and/or U.S. provisional application Ser. No. 60/618,686, filed Oct. 14, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip (such as of the display or camera system or image processor or the like) may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

The display is operable to display the captured rearward images and may comprise a video display and may utilize aspects of the video display devices or modules described in U.S. Pat. Nos. 6,690,268; 7,184,190; 7,274,501; 7,370,983; 7,446,650 and/or 7,855,755, and/or U.S. patent application Ser. No. 10/538,724, filed Jun. 13, 2005 and published Mar. 9, 2006 as U.S. Publication No. US-2006-0050018, which are all hereby incorporated herein by reference in their entireties. The video display may be operable to display images captured by one or more imaging sensors or cameras at the vehicle. The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 6,198,409; 7,005,974; 7,123,168; 7,004,606; 6,946,978; 7,038,577; 6,353,392; 6,320,176; 6,313,454 and 6,824,281, which are all hereby incorporated herein by reference in their entireties.

The video display screen may disposed at an interior rearview mirror assembly of the vehicle (such as in a mirror casing and behind a reflective element of a mirror assembly such that displayed information is viewable through the reflective element of the mirror assembly). The interior mirror assembly may comprise an electro-optic reflective element, such as an electrochromic reflective element, having a transflective mirror reflector (such as one or more thin metallic films or coatings disposed on a surface of a substrate of the reflective element, such as disposed on the front surface of the rear substrate, commonly referred to as the third surface of the mirror reflective element) that is partially transmissive of visible light therethrough and partially reflectant of visible light incident thereon, such as a mirror reflective element of the types described in U.S. Pat. Nos. 7,274,501; 7,255,451; 7,195,381; 7,184,190; 5,668,663; 5,724,187 and/or 6,690,268, which are all hereby incorporated herein by reference in their entireties). Thus, the video display screen, when operating to display video images or the like, is viewable through the transflective mirror reflector and the mirror reflective element by the driver of the vehicle and, when the video display screen is not operating to display video images or the like, the video display screen is not readily viewable or observable or discernible to the driver of the vehicle, such that the presence of the video display screen is rendered covert by the transflective mirror reflector and the driver of the vehicle normally views the mirror reflector and reflective element to view the reflected rearward image at the mirror reflective element. Optionally, the video display screen may be disposed elsewhere in the vehicle, such as at or in an accessory module or windshield electronics module or overhead console or center stack region of the instrument panel or elsewhere at the instrument panel or other areas of the vehicle, while remaining within the spirit and scope of the present invention.

Optionally, the mirror assembly may include one or more displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,855,755; 7,626,749; 7,581,859; 7,338,177; 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties, so that the displays are viewable through the reflective element, while the display area still functions to substantially reflect light, in order to provide a generally uniform prismatic reflective element even in the areas that have display elements positioned behind the reflective element. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036 and/or 7,274,501, which are all hereby incorporated herein by reference in their entireties.

Optionally, the vehicle may include one or more other accessories at or within the mirror assembly or otherwise associated with or near the mirror assembly, such as one or more electrical or electronic devices or accessories, such as a blind spot detection system, such as disclosed in U.S. Pat. Nos. 5,929,786; 8,058,977; 5,786,772; 7,720,580; 7,492,281; 7,038,577 and 6,882,287, a communication module, such as disclosed in U.S. Pat. No. 5,798,688, a voice recorder, microphones, such as disclosed in U.S. Pat. Nos. 7,657,052; 6,243,003; 6,278,377 and/or 6,420,975, speakers, antennas, including global positioning system (GPS) or cellular phone antennas, such as disclosed in U.S. Pat. No. 5,971,552, transmitters and/or receivers, such as a garage door opener or the like or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093 and/or U.S. patent application Ser. No. 12/781,119, filed May 17, 2010 and published Nov. 17, 2011 as U.S. Publication No. US 2011-0280026, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, an imaging system or components or circuitry or display thereof, such as an imaging and/or display system of the types described in U.S. Pat. Nos. 7,881,496; 7,526,103; 7,400,435; 6,690,268 and 6,847,487, and/or U.S. patent application Ser. No. 12/578,732, filed Oct. 14, 2009, now U.S. Pat. No. 9,487,144; and/or Ser. No. 12/508,840, filed Jul. 24, 2009 and published Jan. 28, 2010 as U.S. Publication No. US 2010-0020170, an alert system, such as an alert system of the types described in PCT Application No. PCT/US2010/25545, filed Feb. 26, 2010 and published Sep. 2, 2010 as International Publication No. WO 2010/099416, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4 wd/2 wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522), and/or an ONSTAR® system, a compass, such as disclosed in U.S. Pat. Nos. 5,924,212; 4,862,594; 4,937,945; 5,131,154; 5,255,442 and/or 5,632,092, a control system, such as a control system of the types described in PCT Application No. PCT/US10/38477, filed Jun. 14, 2010 and published Dec. 16, 2010 as International Publication No. WO 2010/144900, and/or any other accessory or circuitry or the like (with the disclosures of the above-referenced patents and patent applications and PCT applications being hereby incorporated herein by reference in their entireties).

The accessory or accessories may be positioned at or within a mirror casing of the interior rearview mirror assembly and may be included on or integrated in the printed circuit board positioned within the mirror casing, such as along a rear surface of the reflective element or elsewhere within a cavity defined by the casing, without affecting the scope of the present invention. The user actuatable inputs described above may be actuatable to control and/or adjust the accessories of the mirror assembly/system and/or an overhead console and/or an accessory module/windshield electronics module and/or the vehicle. The connection or link between the controls and the systems or accessories may be provided via vehicle electronic or communication systems and the like, and may be connected via various protocols or nodes, such as BLUETOOTH®, SCP, UBP, J1850, CAN J2284, Fire Wire 1394, MOST, LIN, FLEXRAY™, Byte Flight and/or the like, or other vehicle-based or in-vehicle communication links or systems (such as WIFI and/or IRDA) and/or the like, depending on the particular application of the mirror/accessory system and the vehicle. Optionally, the connections or links may be provided via wireless connectivity or links, such as via a wireless communication network or system, such as described in U.S. Pat. No. 7,004,593, which is hereby incorporated herein by reference in its entirety, without affecting the scope of the present invention.

Optionally, a display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A method for calibrating a vehicular multi-camera vision system, the method comprising:

moving a vehicle along a vehicle assembly line, wherein the vehicle assembly line has a driver-side target at a driver-side region of the vehicle assembly line and a passenger-side target at a passenger-side region of the vehicle assembly line opposite the driver-side region, and wherein the driver-side target comprises (i) a driver-side longitudinal line at the driver-side region that extends longitudinally along a direction that the vehicle is moving, and (ii) a plurality of driver-side tick marks that extend laterally from the driver-side longitudinal line, and wherein the passenger-side target comprises (i) a passenger-side longitudinal line at the passenger-side region that extends longitudinally along the direction that the vehicle is moving, and (ii) a plurality of passenger-side tick marks that extend laterally from the passenger-side longitudinal line;

equipping the vehicle as it moves along the vehicle assembly line with a plurality of cameras that includes (i) a front camera disposed at a front portion of the vehicle and having a field of view at least forward of the vehicle, (ii) a driver-side camera disposed at a driver side of the vehicle and having a field of view at least sideward of the vehicle, (iii) a passenger-side camera disposed at a passenger side of the vehicle and having a field of view at least sideward of the vehicle, and (iv) a rear camera disposed at a rear of the vehicle and having a field of view at least rearward of the vehicle;

equipping the vehicle as it moves along the vehicle assembly line with an image processor for processing image data captured by the plurality of cameras;

wherein, as the vehicle moves along the vehicle assembly line, the driver-side target at the driver-side region of the vehicle assembly line is viewed by (i) the front camera, (ii) the driver-side camera and (iii) the rear camera;

wherein, as the vehicle moves along the vehicle assembly line, the passenger-side target at a passenger-side region of the vehicle assembly line opposite the driver-side region is viewed by (i) the front camera, (ii) the passenger-side camera and (iii) the rear camera;

capturing image data by the plurality of cameras as the vehicle moves along the vehicle assembly line;

detecting, via processing by the image processor of image data captured by the (i) the front camera, (ii) the driver-side camera and (iii) the rear camera as the vehicle moves along the vehicle assembly line, the driver-side target at the driver-side region;

detecting, via processing by the image processor of image data captured by (i) the front camera, (ii) the passenger-side camera and (iii) the rear camera as the vehicle moves along the vehicle assembly line, the passenger-side target at the passenger-side region;

as the vehicle moves along the vehicle assembly line, determining misalignment of at least one camera of the plurality of cameras responsive to processing by the image processor of (i) image data of the driver-side target captured by the front camera, the rear camera and the driver-side camera and (ii) image data of the passenger-side target captured by the front camera, the rear camera and the passenger-side camera; and calibrating the vehicular multi-camera vision system by adjusting processing by the image processor of image data captured by the at least one misaligned camera to accommodate misalignment of the at least one misaligned camera.

2. The method of claim 1, wherein calibrating the vehicular multi-camera vision system comprises first calibrating the vehicular multi-camera vision system to accommodate misalignment of the front camera responsive to processing by the image processor of image data captured by the front camera of the driver-side target and the passenger-side target.

3. The method of claim 2, wherein calibrating the vehicular multi-camera vision system comprises calibrating the vehicular multi-camera vision system to accommodate misalignment of the driver-side camera after calibrating the vehicular multi-camera vision system to accommodate misalignment of the front camera, and wherein calibrating the vehicular multi-camera vision system to accommodate misalignment of the driver-side camera is responsive to processing by the image processor of image data captured by the driver-side camera of the driver-side target, and wherein calibrating the plurality of cameras comprises calibrating the vehicular multi-camera vision system to accommodate misalignment of the passenger-side camera after calibrating the vehicular multi-camera vision system to accommodate misalignment of the front camera, and wherein calibrating the vehicular multi-camera vision system to accommodate misalignment of the passenger-side camera is responsive to processing by the image processor of image data captured by the passenger-side camera of the passenger-side target.

4. The method of claim 3, wherein calibrating the vehicular multi-camera vision system comprises calibrating the vehicular multi-camera vision system to accommodate misalignment of the rear camera after calibrating the vehicular multi-camera vision system to accommodate misalignment of the driver-side camera and the passenger-side camera, and wherein calibrating the vehicular multi-camera vision system to accommodate misalignment of the rear camera is responsive to processing by the image processor of image data captured by the rear camera of the driver-side target and the passenger-side target.

5. The method of claim 1, wherein the driver-side target is disposed at a ground location at the driver-side region of the vehicle assembly line so as to be viewed by overlapping portions of the fields of views of the front camera and the driver-side cameras as the vehicle moves along the vehicle assembly line, and wherein the passenger-side target is disposed at a ground location at the passenger-side region of the vehicle assembly line so as to be viewed by overlapping portions of the fields of views of the front camera and the passenger-side camera as the vehicle moves along the vehicle assembly line.

6. The method of claim 1, wherein the driver-side target comprises a pair of parallel spaced-apart driver-side longitudinal lines at the driver-side region, with the plurality of driver-side tick marks extending laterally from each of the parallel spaced-apart driver-side longitudinal lines, and wherein the passenger-side target comprises a pair of parallel spaced-apart passenger-side longitudinal lines at the passenger-side region, with the plurality of passenger-side tick marks extending laterally from each of the parallel spaced-apart passenger-side longitudinal lines.

7. The method of claim 1, comprising, responsive to detecting the driver-side target and the passenger-side target, capturing and storing image data for an image data stitching computation.

8. The method of claim 1, wherein calibrating the vehicular multi-camera vision system comprises, via processing by the image processor of image data captured by the plurality of cameras, adjusting processing by the image processor of image data captured by the at least one misaligned camera to accommodate for multi-axial misalignment of the at least one misaligned camera.

9. The method of claim 8, comprising determining multi-axial orientation of each camera of the plurality of cameras by determining pitch, yaw and roll of each camera of the plurality of cameras.

10. The method of claim 1, wherein calibrating the vehicular multi-camera vision system comprises correcting for lens distortion of a lens of each camera of the plurality of cameras.

11. The method of claim 10, wherein correcting for lens distortion of a lens of each camera of the plurality of cameras is based at least in part on lens nominal design data.

12. The method of claim 1, wherein calibrating the vehicular multi-camera vision system comprises determining a relationship between a degree of curvature of horizontal lines and vertical misalignment of a lens of each camera of the plurality of cameras to a center of an imager for each camera.

13. The method of claim 1, wherein adjusting processing by the image processor of image data captured by the at least one misaligned camera comprises adjusting processing by the image processor of image data captured by the at least one misaligned camera to correct for angular misalignment of the at least one misaligned camera.

14. The method of claim 1, wherein adjusting processing by the image processor of image data captured by the at least one misaligned camera comprises adjusting processing by the image processor of image data captured by the at least one misaligned camera to correct for translational misalignment of the at least one misaligned camera.

15. The method of claim 1, wherein adjusting processing by the image processor of image data captured by the at least one misaligned camera utilizes a perspective correction that comprises a mathematical model of homographic transformation represented by a 3×3 matrix.

16. The method of claim 1, wherein calibrating the vehicular multi-camera vision system comprises an initial calibration process and, following the initial calibration process, a fine tuning calibration process to enhance image data stitching for images derived from image data captured by the plurality of cameras for display of stitched images at a display screen of the vehicle.

17. A method for calibrating a vehicular multi-camera vision system, the method comprising:

moving a vehicle along a vehicle assembly line, wherein the vehicle assembly line has a driver-side target at a driver-side region of the vehicle assembly line and a passenger-side target at a passenger-side region of the vehicle assembly line opposite the driver-side region, and wherein the driver-side target comprises (i) a pair of parallel spaced-apart driver-side longitudinal lines at the driver-side region that extend longitudinally along a direction that the vehicle is moving, and (ii) a plurality of driver-side tick marks that extend laterally from each of the parallel spaced-apart driver-side longitudinal lines, and wherein the passenger-side target comprises (i) a pair of parallel spaced-apart passenger-side longitudinal lines at the passenger-side region that extend longitudinally along the direction that the vehicle is moving, and (ii) a plurality of passenger-side tick marks that extend laterally from each of the parallel spaced-apart passenger-side longitudinal lines;

equipping the vehicle as it moves along the vehicle assembly line with a plurality of cameras that includes (i) a front camera disposed at a front portion of the vehicle and having a field of view at least forward of the vehicle, (ii) a driver-side camera disposed at a driver side of the vehicle and having a field of view at least sideward of the vehicle, (iii) a passenger-side camera disposed at a passenger side of the vehicle and having a field of view at least sideward of the vehicle, and (iv) a rear camera disposed at a rear of the vehicle and having a field of view at least rearward of the vehicle;

equipping the vehicle as it moves along the vehicle assembly line with an image processor for processing image data captured by the plurality of cameras;

wherein the driver-side target is disposed at a ground location at the driver-side region of the vehicle assembly line so as to be viewed by overlapping portions of the fields of views of the front camera and the driver-side camera as the vehicle moves along the vehicle assembly line, and wherein the passenger-side target is disposed at a ground location at the passenger-side region of the vehicle assembly line so as to be viewed by overlapping portions of the fields of views of the front camera and the passenger-side camera as the vehicle moves along the vehicle assembly line;

wherein, as the vehicle moves along the vehicle assembly line, the driver-side target at the driver-side region of the vehicle assembly line is viewed by (i) the front camera, (ii) the driver-side camera and (iii) the rear camera;

wherein, as the vehicle moves along the vehicle assembly line, the passenger-side target at a passenger-side region of the vehicle assembly line opposite the driver-side region is viewed by (i) the front camera, (ii) the passenger-side camera and (iii) the rear camera;

capturing image data by the plurality of cameras as the vehicle moves along the vehicle assembly line;

detecting, via processing by the image processor of image data captured by the (i) the front camera, (ii) the driver-side camera and (iii) the rear camera as the vehicle moves along the vehicle assembly line, the driver-side target at the driver-side region;

detecting, via processing by the image processor of image data captured by (i) the front camera, (ii) the passenger-side camera and (iii) the rear camera as the vehicle moves along the vehicle assembly line, the passenger-side target at the passenger-side region;

as the vehicle moves along the vehicle assembly line, determining misalignment of at least one camera of the plurality of cameras responsive to processing by the image processor of (i) image data of the driver-side target captured by the front camera, the rear camera and the driver-side camera and (ii) image data of the passenger-side target captured by the front camera, the rear camera and the passenger-side camera; and calibrating the vehicular multi-camera vision system by adjusting processing by the image processor of image data captured by the at least one misaligned camera to accommodate misalignment of the at least one misaligned camera.

18. The method of claim 17, wherein calibrating the vehicular multi-camera vision system comprises first calibrating the vehicular multi-camera vision system to accommodate misalignment of the front camera responsive to processing by the image processor of image data captured by the front camera of the driver-side target and the passenger-side target.

19. The method of claim 18, wherein calibrating the vehicular multi-camera vision system comprises calibrating the vehicular multi-camera vision system to accommodate misalignment of the driver-side camera after calibrating the vehicular multi-camera vision system to accommodate misalignment of the front camera, and wherein calibrating the vehicular multi-camera vision system to accommodate misalignment of the driver-side camera is responsive to processing by the image processor of image data captured by the driver-side camera of the driver-side target, and wherein calibrating the plurality of cameras comprises calibrating the vehicular multi-camera vision system to accommodate misalignment of the passenger-side camera after calibrating the vehicular multi-camera vision system to accommodate misalignment of the front camera, and wherein calibrating the vehicular multi-camera vision system to accommodate misalignment of the passenger-side camera is responsive to processing by the image processor of image data captured by the passenger-side camera of the passenger-side target.

20. The method of claim 19, wherein calibrating the vehicular multi-camera vision system comprises calibrating the vehicular multi-camera vision system to accommodate misalignment of the rear camera after calibrating the vehicular multi-camera vision system to accommodate misalignment of the driver-side camera and the passenger-side camera, and wherein calibrating the vehicular multi-camera vision system to accommodate misalignment of the rear camera is responsive to processing by the image processor of image data captured by the rear camera of the driver-side target and the passenger-side target.

21. The method of claim 17, wherein calibrating the vehicular multi-camera vision system comprises, via processing by the image processor of image data captured by the plurality of cameras, adjusting processing by the image processor of image data captured by the at least one misaligned camera to accommodate for multi-axial misalignment of the at least one misaligned camera.

22. The method of claim 21, comprising determining multi-axial orientation of each camera of the plurality of cameras by determining pitch, yaw and roll of each camera of the plurality of cameras.

23. The method of claim 17, wherein calibrating the vehicular multi-camera vision system comprises correcting for lens distortion of a lens of each camera of the plurality of cameras.

24. The method of claim 17, wherein adjusting processing by the image processor of image data captured by the at least one misaligned camera comprises adjusting processing by the image processor of image data captured by the at least one misaligned camera to correct for angular misalignment of the at least one misaligned camera.

25. A method for calibrating a vehicular multi-camera vision system, the method comprising:

moving a vehicle along a vehicle assembly line, wherein the vehicle assembly line has a driver-side target at a driver-side region of the vehicle assembly line and a passenger-side target at a passenger-side region of the vehicle assembly line opposite the driver-side region, and wherein the driver-side target comprises (i) a driver-side longitudinal line at the driver-side region that extends longitudinally along a direction that the vehicle is moving, and (ii) a plurality of driver-side tick marks that extend laterally from the driver-side longitudinal line, and wherein the passenger-side target comprises (i) a passenger-side longitudinal line at the passenger-side region that extends longitudinally along the direction that the vehicle is moving, and (ii) a plurality of passenger-side tick marks that extend laterally from the passenger-side longitudinal line;

equipping the vehicle as it moves along the vehicle assembly line with a plurality of cameras that includes (i) a front camera disposed at a front portion of the vehicle and having a field of view at least forward of the vehicle, (ii) a driver-side camera disposed at a driver side of the vehicle and having a field of view at least sideward of the vehicle, (iii) a passenger-side camera disposed at a passenger side of the vehicle and having a field of view at least sideward of the vehicle, and (iv) a rear camera disposed at a rear of the vehicle and having a field of view at least rearward of the vehicle;

equipping the vehicle as it moves along the vehicle assembly line with an image processor for processing image data captured by the plurality of cameras;

wherein the driver-side target is disposed at the driver-side region of the vehicle assembly line so as to be viewed by overlapping portions of the fields of views of the front camera and the driver-side camera as the vehicle moves along the vehicle assembly line, and wherein the passenger-side target is disposed at the passenger-side region of the vehicle assembly line so as to be viewed by overlapping portions of the fields of views of the front camera and the passenger-side camera as the vehicle moves along the vehicle assembly line;

wherein, as the vehicle moves along the vehicle assembly line, the driver-side target at the driver-side region of the vehicle assembly line is viewed by (i) the front camera, (ii) the driver-side camera and (iii) the rear camera;

wherein, as the vehicle moves along the vehicle assembly line, the passenger-side target at a passenger-side region of the vehicle assembly line opposite the driver-side region is viewed by (i) the front camera, (ii) the passenger-side camera and (iii) the rear camera;

capturing image data by the plurality of cameras as the vehicle moves along the vehicle assembly line;

detecting, via processing by the image processor of image data captured by the (i) the front camera, (ii) the driver-side camera and (iii) the rear camera as the vehicle moves along the vehicle assembly line, the driver-side target at the driver-side region;

detecting, via processing by the image processor of image data captured by (i) the front camera, (ii) the passenger-side camera and (iii) the rear camera as the vehicle moves along the vehicle assembly line, the passenger-side target at the passenger-side region;

as the vehicle moves along the vehicle assembly line, determining misalignment of at least one camera of the plurality of cameras responsive to processing by the image processor of (i) image data of the driver-side target captured by the front camera, the rear camera and the driver-side camera and (ii) image data of the passenger-side target captured by the front camera, the rear camera and the passenger-side camera; and calibrating the vehicular multi-camera vision system by adjusting processing by the image processor of image data captured by the at least one misaligned camera to accommodate for multi-axial misalignment of the at least one misaligned camera.

26. The method of claim 25, wherein calibrating the vehicular multi-camera vision system comprises first calibrating the vehicular multi-camera vision system to accommodate misalignment of the front camera responsive to processing by the image processor of image data captured by the front camera of the driver-side target and the passenger-side target.

27. The method of claim 26, wherein calibrating the vehicular multi-camera vision system comprises calibrating the vehicular multi-camera vision system to accommodate misalignment of the driver-side camera after calibrating the vehicular multi-camera vision system to accommodate misalignment of the front camera, and wherein calibrating the vehicular multi-camera vision system to accommodate misalignment of the driver-side camera is responsive to processing by the image processor of image data captured by the driver-side camera of the driver-side target, and wherein calibrating the plurality of cameras comprises calibrating the vehicular multi-camera vision system to accommodate misalignment of the passenger-side camera after calibrating the vehicular multi-camera vision system to accommodate misalignment of the front camera, and wherein calibrating the vehicular multi-camera vision system to accommodate misalignment of the passenger-side camera is responsive to processing by the image processor of image data captured by the passenger-side camera of the passenger-side target.

28. The method of claim 27, wherein calibrating the vehicular multi-camera vision system comprises calibrating the vehicular multi-camera vision system to accommodate misalignment of the rear camera after calibrating the vehicular multi-camera vision system to accommodate misalignment of the driver-side camera and the passenger-side camera, and wherein calibrating the vehicular multi-camera vision system to accommodate misalignment of the rear camera is responsive to processing by the image processor of image data captured by the rear camera of the driver-side target and the passenger-side target.

29. The method of claim 25, comprising determining multi-axial orientation of each camera of the plurality of cameras by determining pitch, yaw and roll of each camera of the plurality of cameras.

30. The method of claim 25, wherein calibrating the vehicular multi-camera vision system comprises correcting for lens distortion of a lens of each camera of the plurality of cameras.

31. The method of claim 25, wherein adjusting processing by the image processor of image data captured by the at least one misaligned camera comprises adjusting processing by the image processor of image data captured by the at least one misaligned camera to correct for angular misalignment of the at least one misaligned camera.

\* \* \* \* \*

UNITED STATES PATENT AND TRADEMARK OFFICE
CERTIFICATE OF CORRECTION

PATENT NO.       : 11,265,514 B2
APPLICATION NO.  : 17/248420
DATED            : March 1, 2022
INVENTOR(S)      : Yuesheng Lu et al.

It is certified that error appears in the above-identified patent and that said Letters Patent is hereby corrected as shown below:

In the Specification

Column 3
Line 51, "m is-match" should be --mis-match--

Column 7
Line 18, "NC" should be --A/C--

Signed and Sealed this
Third Day of May, 2022

Katherine Kelly Vidal
*Director of the United States Patent and Trademark Office*